United States Patent
Suzuki et al.

(10) Patent No.: US 6,990,675 B2
(45) Date of Patent: Jan. 24, 2006

(54) RECORDING MEDIUM PLAYBACK DEVICE

(75) Inventors: Toru Suzuki, Saitama (JP); Susumu Yoshida, Saitama (JP); Kenji Nakamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 509 days.

(21) Appl. No.: 09/740,989

(22) Filed: Dec. 21, 2000

(65) Prior Publication Data
US 2001/0017839 A1    Aug. 30, 2001

(30) Foreign Application Priority Data
Dec. 27, 1999    (JP)    ............... P. 11-370362

(51) Int. Cl.
*G11B 17/28*    (2006.01)
(52) U.S. Cl. .................................... 720/672
(58) Field of Classification Search ............... 369/192; 720/672, 619, 675, 695, 703, 712; 360/132, 360/135
See application file for complete search history.

(56) References Cited

U.S. PATENT DOCUMENTS

| | | | |
|---|---|---|---|
| 5,138,591 A | 8/1992 | Ogawa et al. ............... | 369/36 |
| 5,682,364 A | 10/1997 | Ogawa ......................... | 369/36 |
| 5,917,787 A | 6/1999 | Tsuchiya et al. ............. | 369/36 |
| 6,198,716 B1 | 3/2001 | Tamiya et al. | |
| 6,459,674 B1 * | 10/2002 | Matsumoto et al. ........ | 369/263 |

FOREIGN PATENT DOCUMENTS

| | | |
|---|---|---|
| DE | 197 53 690 | 7/1998 |
| EP | 0 962 926 | 12/1999 |
| JP | 2000-163851 | 6/2000 |

* cited by examiner

*Primary Examiner*—William Korzuch
*Assistant Examiner*—Christopher R. Magee
(74) *Attorney, Agent, or Firm*—Sughrue Mion, PLLC

(57) ABSTRACT

A recording medium playback device includes a recording medium accommodation unit, a carriage chassis having a pickup, a turntable and a pickup moving device, and a moving device. The moving device moves the carriage chassis from a standby position to a position between recording mediums accommodated in the recording medium accommodation unit to play back a recording medium. The recording medium loading device loads the recording medium inserted from outside into the recording medium accommodation unit. Also, when the carriage chassis is in the standby position, the pickup is situated on a vertical tangential plane tangent to an outer circumferential edge of the recording medium on the carriage chassis side at a point where the outer circumferential edge is intersected by a loading center line of the recording medium when the recording medium is completely loaded in the recording medium accommodation unit by the recording medium loading device.

13 Claims, 20 Drawing Sheets

RECORDING MEDIUM PLAYBACK DEVICE

BACKGROUND OF THE INVENTION

The present invention relates to a recording medium playback device capable of playing back a recording medium already recorded with information or of recording information on an information-recordable medium, and more particularly to a recording medium playback device which is reduced in size to facilitate its installation in vehicles.

Among the conventional recording medium playback devices capable of playing back a recording medium already recorded with information or of recording information on an information-recordable medium (hereinafter referred to as a playback device) is a playback device which has a plurality of recording media automatically arrayed and accommodated inside the playback device and which selects an arbitrary recording medium for playback, as described in JP-A-10-337145 previously filed by the applicant of this invention.

This playback device a is shown in FIG. 25. When a user inserts a recording medium c from an insertion opening b, drive rollers d are automatically rotated in synchronism with each other, loading the recording medium c into the interior of a case. When the outermost peripheral edge of the recording medium c on the carriage chassis g side abuts against a stopper e, the recording medium c is stopped to prevent its excess insertion and then installed into a vacant tray f standing by at the insertion position. Then, when the recording medium c is to be played back, the carriage chassis g is pivoted clockwise about a support shaft h as a pivoting axis by a predetermined distance to have its turntable i and clamper j face the bottom side and top side of the recording medium c, respectively, and then performs a clamping action to clamp the recording medium c. Then, a pickup k is slid in the radial direction of the recording medium c by a pickup moving mechanism m to read information recorded in the recording medium c, thus starting the playback. In this figure, the direction in which to load the recording medium is taken as an X direction, the direction in which to clamp the recording medium is taken as a Z direction, and the direction perpendicular to the X and Z directions is taken as a Y direction.

Considering the X-direction distance traveled by the pickup k (diameter of the recording medium c) and the mounting position on the carriage chassis g of the stopper e that abuts against the outermost peripheral edge of the recording medium c, the playback device a needs a depth $L_1+L_2+L_3$, which is a sum of the X-direction distance $L_1$ traveled by the recording medium c from the insertion opening b to the tray f along its loading center line (diameter of the recording medium c), the X-direction distance $L_2$ along the loading center line of the recording medium c traveled by the carriage chassis g having a guide member n and a feed screw o spaced apart for sliding the pickup k, and the clearance distance $L_3$ between the recording medium c and the carriage chassis g in the X direction along the loading center line of the recording medium c.

For that purpose, the depth $L_1+L_2+L_3$ required by the playback device a must be secured to some extent. In recent years, an instrument panel arranged at the front part of the cabin of vehicles is provided with an accommodation space having a dimension compatible with a predetermined standard, for example, DIN (Deutsches Institut fur Normung). That is, unless the playback device a has a depth $L_1+L_2+L_3$ that fits in this standardized dimension, the front panel of the playback device a, when the playback device a is installed, may protrude from the accommodation space in the instrument panel. If the playback device a is mounted in the instrument panel in such a condition, the differences in the depth dimension between the playback device a and other devices mounted vertically above or below the playback device a cause steps to be formed between the protruding front panel of the playback device a and those of the other devices, making them difficult to use or impairing the appearance. Further, a gap between the playback device a and the accommodation space of the instrument panel caused by the protruding front panel will likely allow dirt or dust to enter into the interior of the playback device a, leading to a failure of the playback device a.

SUMMARY OF THE INVENTION

The present invention has been accomplished in light of these conventional problems and provides a playback device which is reduced in the depth dimension to make the device smaller so that the entire playback device can be installed in a reduced-size accommodation space in the instrument panel provided at the front part of the cabin in a vehicle.

To achieve the above objective, there is provided a recording medium playback device according to one aspect of this invention, which comprises: a recording medium accommodation unit for accommodating a plurality of recording mediums in a stacked array; a carriage chassis having at least a pickup, a turntable and a pickup moving means, the pickup moving means being adapted to move the pickup in the direction of playing back the recording medium; a moving means for moving the carriage chassis from a standby position to a position between the recording mediums accommodated in the recording medium accommodation unit to play back the recording medium; and a recording medium loading means for loading the recording medium inserted from outside into the recording medium accommodation unit; wherein when the carriage chassis is in the standby position, the pickup is situated on a vertical tangential plane which is tangent to an outer circumferential edge of the recording medium on the carriage chassis side at a point where the outer circumferential edge is intersected by a loading center line of the recording medium when the recording medium is completely loaded in the recording medium accommodation unit by the recording medium loading means.

Another aspect of the invention is that the pickup moving means has a feed screw mechanism to move the pickup in a recording medium playback direction and the feed screw mechanism is provided on the underside of the pickup.

Still another aspect of the invention is that the pickup moving means has a guide means to guide the pickup in the recording medium playback direction and the guide means is provided on the underside of the pickup.

A further aspect of the invention is that when the carriage chassis is in the standby position, the pickup on the carriage chassis is at a position not on the loading center of the recording medium accommodated in the recording medium accommodation unit.

A further aspect of the invention is that a width of a part of the carriage chassis in the recording medium loading direction is smaller than a width of the pickup in the recording medium loading direction, and a part of the recording medium accommodated in the recording medium accommodation unit is situated in an area formed by setting the width of a part of the carriage chassis smaller than the width of the pickup.

According to a further aspect of the invention there is provided a recording medium playback device, which comprises: a recording medium accommodation unit for accommodating a plurality of recording mediums in a stacked array; a carriage chassis having at least a pickup, a turntable and a pickup moving means, the pickup moving means being adapted to move the pickup in the direction of playing back the recording medium; a moving means for moving the carriage chassis from a standby position to a position between the recording mediums accommodated in the recording medium accommodation unit to play back the recording medium; and a recording medium loading means for loading the recording medium inserted from outside into the recording medium accommodation unit; wherein when the carriage chassis is in the standby position, the turntable is situated on a vertical tangential plane which is tangent to an outer circumferential edge of the recording medium on the carriage chassis side at a point where the outer circumferential edge is intersected by a loading center line of the recording medium when the recording medium is completely loaded in the recording medium accommodation unit by the recording medium loading means.

According to a further aspect of the invention there is provided a recording medium playback device, which comprises: a recording medium accommodation unit for accommodating a plurality of recording mediums in a stacked array; a carriage chassis having at least a pickup, a turntable and a pickup moving means, the pickup moving means being adapted to move the pickup in the direction of playing back the recording medium; a moving means for moving the carriage chassis to a position between the recording mediums accommodated in the recording medium accommodation unit to play back the recording medium; a recording medium loading means for loading the recording medium inserted from outside into the recording medium accommodation unit; and a stopper portion for abutting against an outer circumferential edge of the recording medium loaded by the recording medium loading means; wherein the stopper portion is provided in the carriage chassis and is located at a position spaced from a loading center line of the recording medium accommodated in the recording medium accommodation unit.

DETAILED DESCRIPTION OF THE PREFERRED EMBODIMENTS

Embodiments of the playback device applying the present invention will be described in detail by referring to FIGS. 1 through 13. In these drawings, too, the direction in which to load the recording medium B is taken as an X direction, the direction in which to clamp the recording medium B is taken as a Z direction, and the direction perpendicular to the X and Z directions is taken as a Y direction.

First, the outline of the playback device A will be explained by referring to FIGS. 1 and 2.

Figure 1:
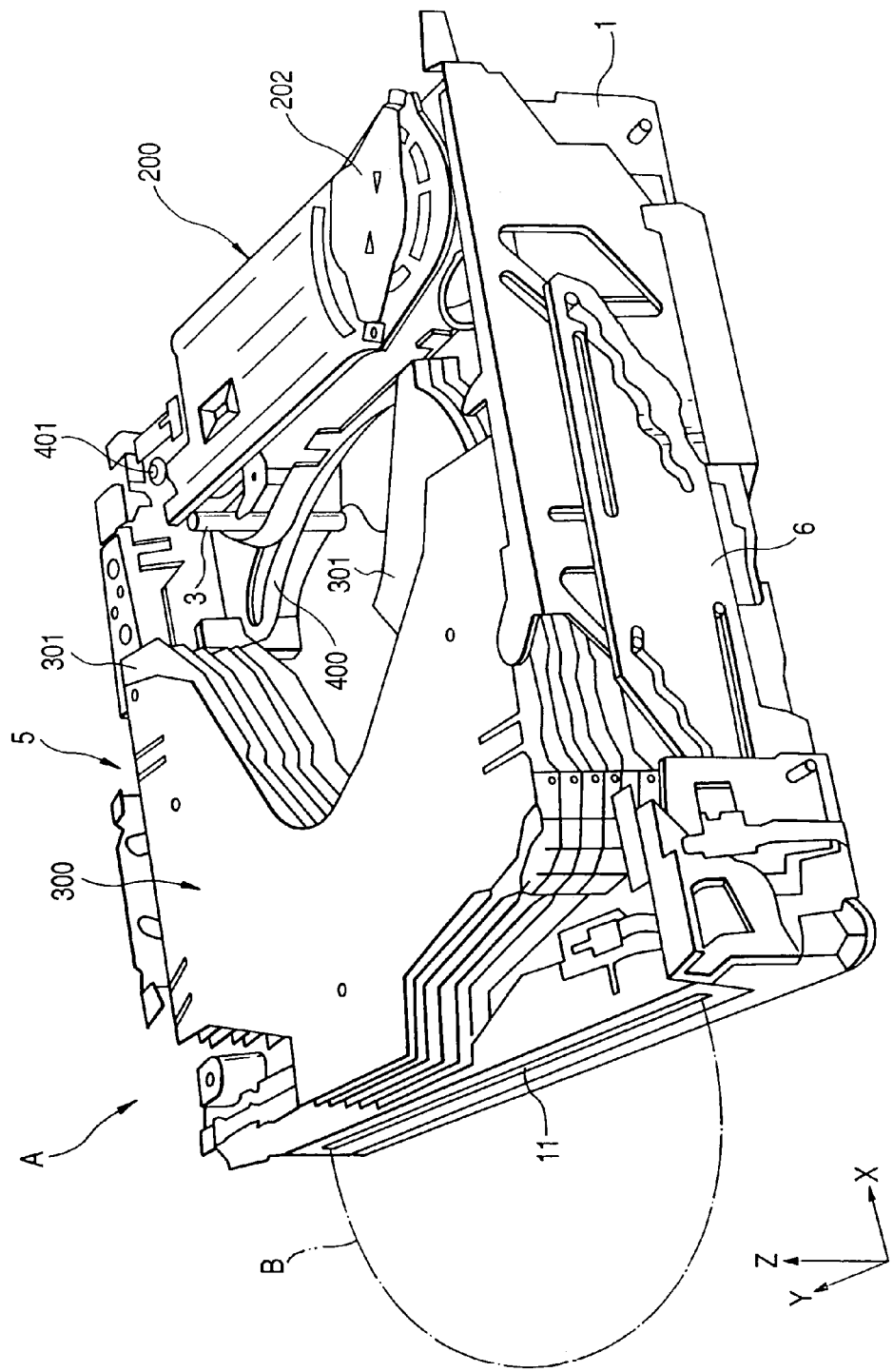
FIG. 1 is an overall perspective view of the recording medium playback device applying this invention.
Figure 2:
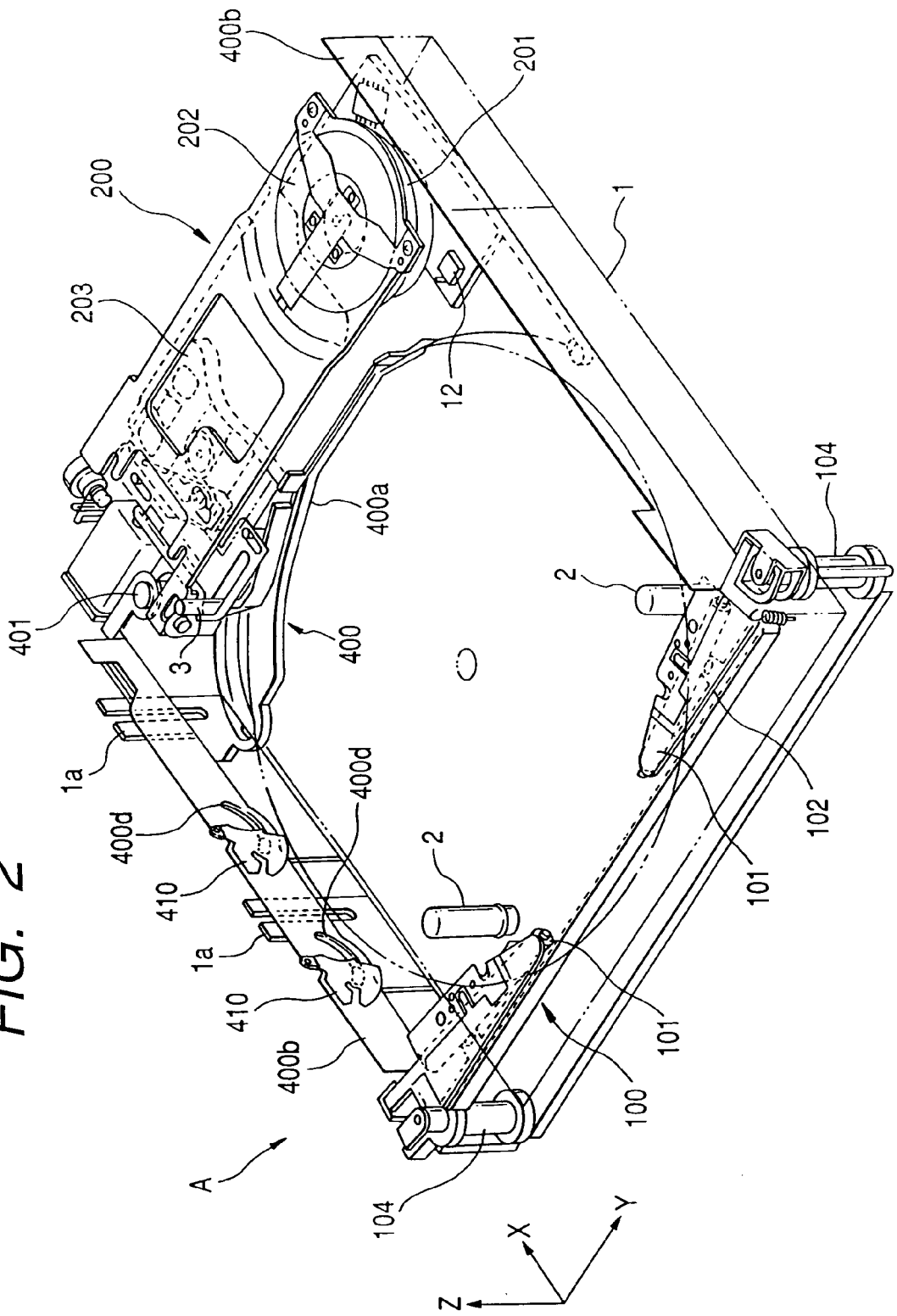
FIG. 2 is a partial perspective view of the recording medium playback device of FIG. 1, with one part omitted.

FIG. 1 is an overall perspective view of the playback device A applying this invention and FIG. 2 is a partial perspective view with one part omitted from the playback device A of FIG. 1.

In a main chassis 1 of the playback device A are installed at their corresponding positions a recording medium loading mechanism (hereinafter referred to as a loading mechanism) 100 for loading and unloading the recording medium B (shown in FIG. 2); an accommodation unit 300 for accommodating the loaded recording medium B; a movable chassis 400 moving vertically in the direction of clamping the recording medium B. i.e., in the Z direction; and a carriage chassis 200 pivotally mounted on the movable chassis 400 and carrying a pickup 203 for playing back the information recorded surface of the recording medium B.

First, the loading mechanism 100 will be described by referring to FIGS. 2 to 4. FIG. 3 is a front view and an essential-part cross section of the loading mechanism 100. FIG. 4 is a plan view of a drive roller 101.

The loading mechanism 100 carries the recording medium B inserted from the insertion opening 11 (shown in FIG. 1) in the front panel by the user to the accommodation unit 300 and also moves the recording medium B accommodated in the accommodation unit 300 to the outside of the device.

The recording medium B inserted from the insertion opening 11 into a loading passage 102 contacts, from its bottom side, a pair of drive rollers 101 arranged parallelly in the Y direction and is moved in the X direction by the synchronized rotation of the paired drive rollers 101.

The drive rollers 101 are synchronously rotated in the forward or backward direction about their axes, the same direction in which the recording medium B is fed. The drive rollers 101 have their surfaces tapered off gradually toward the loading center of the recording medium B so that the recording medium B is progressively centered as it is fed.

Figure 3A:
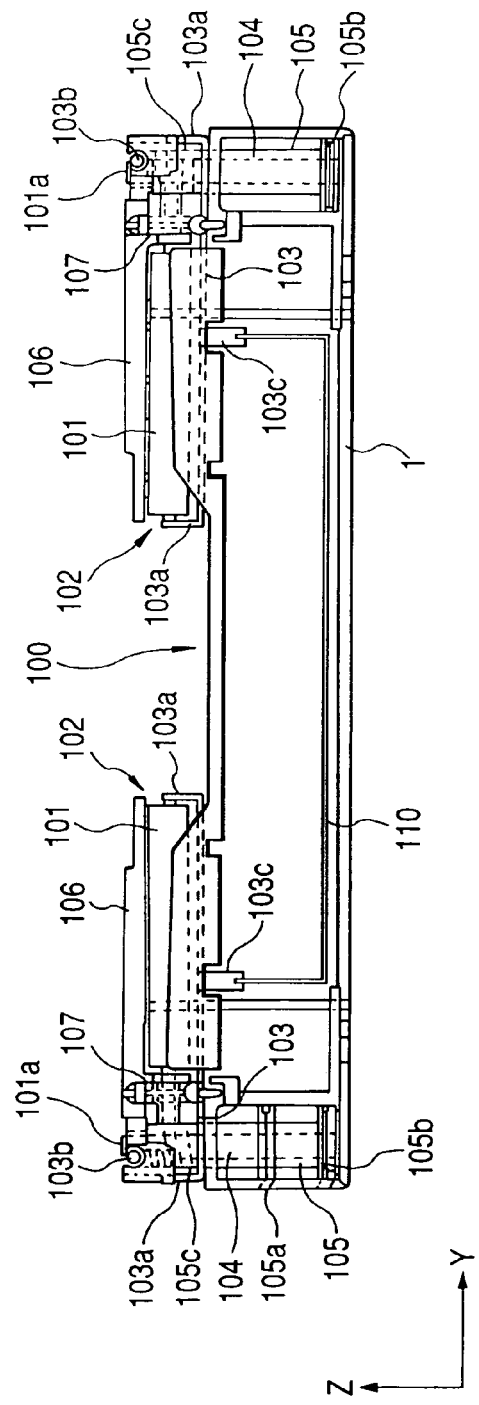
FIG. 3A is a front view of the recording medium playback device.
Figure 4:
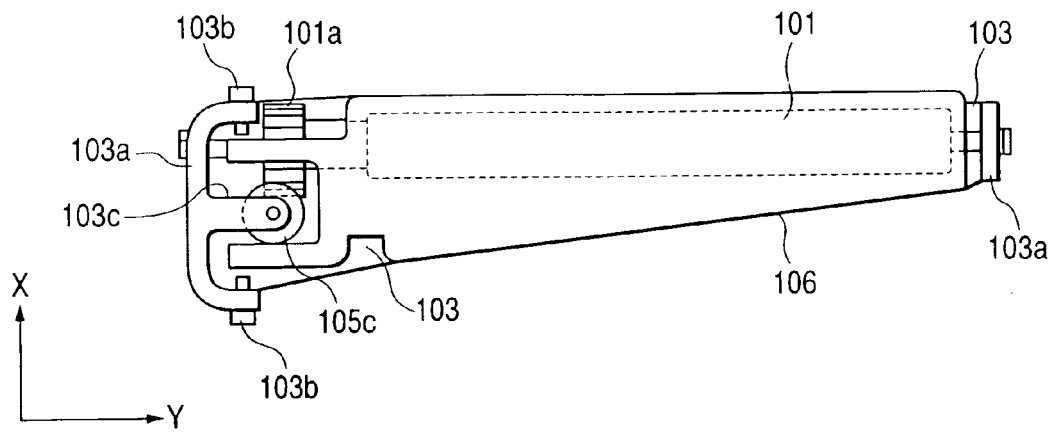
FIG. 4 is a plan view of the drive rollers.

The drive rollers 101, as shown in FIG. 3A, are rotatably supported by a pair of support chassis 103. The support chassis 103 can be pivoted horizontally by a drive roller moving mechanism described later through a predetermined angle about support shafts 104 erected in the Z direction.

As shown in FIGS. 3A and 4, one end of each of the drive rollers 101 is formed integral with a gear portion 101a which is coaxial with the drive roller 101. Below each of the drive rollers 101 is the support chassis 103 that has at both ends a pair of erect riser plate portions 103a, on which the ends of each drive roller 101 are rotatably supported.

Passage restriction members 106 are arranged above the drive rollers 101 and supported on the riser plate portions 103a so that they are rotatable about fulcrums 103b. A space between the passage restriction members 106 and the drive rollers 101 is the loading passage 102. Between the passage restriction members 106 and the support chassis 103 are disposed coil springs 107 that urge the passage restriction members 106 toward the drive rollers 101.

On both sides of the main chassis 1 with respect to the Y direction are provided a pair of pivotal members 105 that can pivot about shafts 104 extending in the Z direction and which have their ends pivotally supported on the main chassis 1 and on projecting plates 103c of the support chassis 103. The pivotal members 105 pass through holes (not shown) formed in the support chassis 103.

The upper ends of the pivotal members 105 are formed with a gear portion 105c in mesh with the gear portion 101a coaxial with the drive roller 101. One of the pivotal members 105 has a drive transmission pulley 105a arranged at its central portion which transfers the drive force of a motor 108 (shown in FIG. 14) to a belt 109 (shown in FIG. 14). The pivotal members 105 each have a synchronous pulley (not shown) at the lower end 105b. The paired pivotal members 105 are driven synchronously by a belt (not shown) wound around the synchronous pulleys. With this construction the drive force of one motor is transmitted to the two drive rollers 101.

The support chassis 103 each have a downwardly projecting plates 103c. On the main chassis 1 is mounted a movable member 110 which is movable in the X direction of FIG. 3 and engages with the projecting plates 103c. In this construction, when the movable member 110 is moved in the X direction, the support chassis 103 pivot about the shafts 104 of the pivotal members 105, causing the drive rollers 101 to pivot about the shafts 104. At this time, the gear portions 101a of the drive rollers 101 and the gear portions 105c of the pivotal members 105 are vertically in mesh, so their meshing engagement will not be released. In this construction the drive rollers 101 can pivot about the shafts 104 situated at the ends of the insertion opening 11.

Figure 3C:
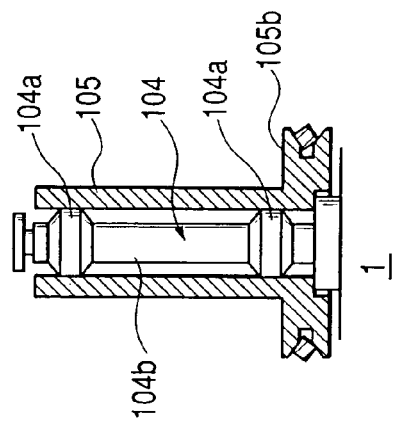
FIG. 3B and FIG. 3C are essential-part cross sections of FIG. 3A.
Figure 3B:
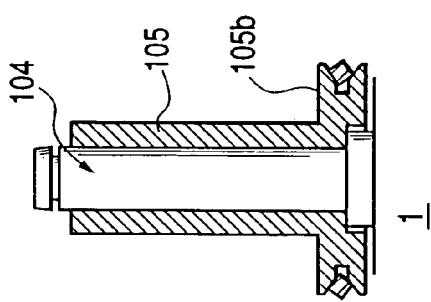

Shown in FIG. 3B is one embodiment of the interior structure of the pivotal members 105. The outer circumferential surface of the shaft 104 erected on the main chassis 1 and the inner circumferential surface of the pivotal member 105 are so shaped that they can be brought into sliding contact, with a small gap in the cylinder filled with grease as a lubricating oil to reduce inner frictional resistance. In this construction, however, the area of sliding contact between the shaft 104 and the pivotal member 105 is large, and it is desirable to reduce the sliding contact area.

Hence, as shown in FIG. 3C, the shaft 104 is provided with sliding contact portions 104a at the upper and lower parts thereof that are in sliding contact with the inner circumferential surface of the pivotal member 105 and also with an intermediate portion 104b between the sliding contact portions 104a which is smaller in diameter than the sliding contact portions 104a. The gap in the cylinder may be filled with grease. This construction can further reduce the frictional resistance in the pivotal members 105.

A plurality of photosensors (not shown) for detecting the loading/unloading state of the recording medium B are placed at appropriate positions on the main chassis 1 of the playback device A. Of the plurality of the photosensors, one is located at a position near the insertion opening 11 and away from the bottom surface of the loaded/unloaded recording medium B; and the other is located at a position away from the bottom surface of the accommodation unit 300 and near the bottom surface of the loaded/unloaded recording medium B. Arranged near one of the paired drive rollers 101 described above is a photosensor switch (not shown). This photosensor switch and the one photosensor are in such a positional relationship as can determine whether the recording medium has a large diameter or a different diameter (e.g., small diameter).

Figure 5:
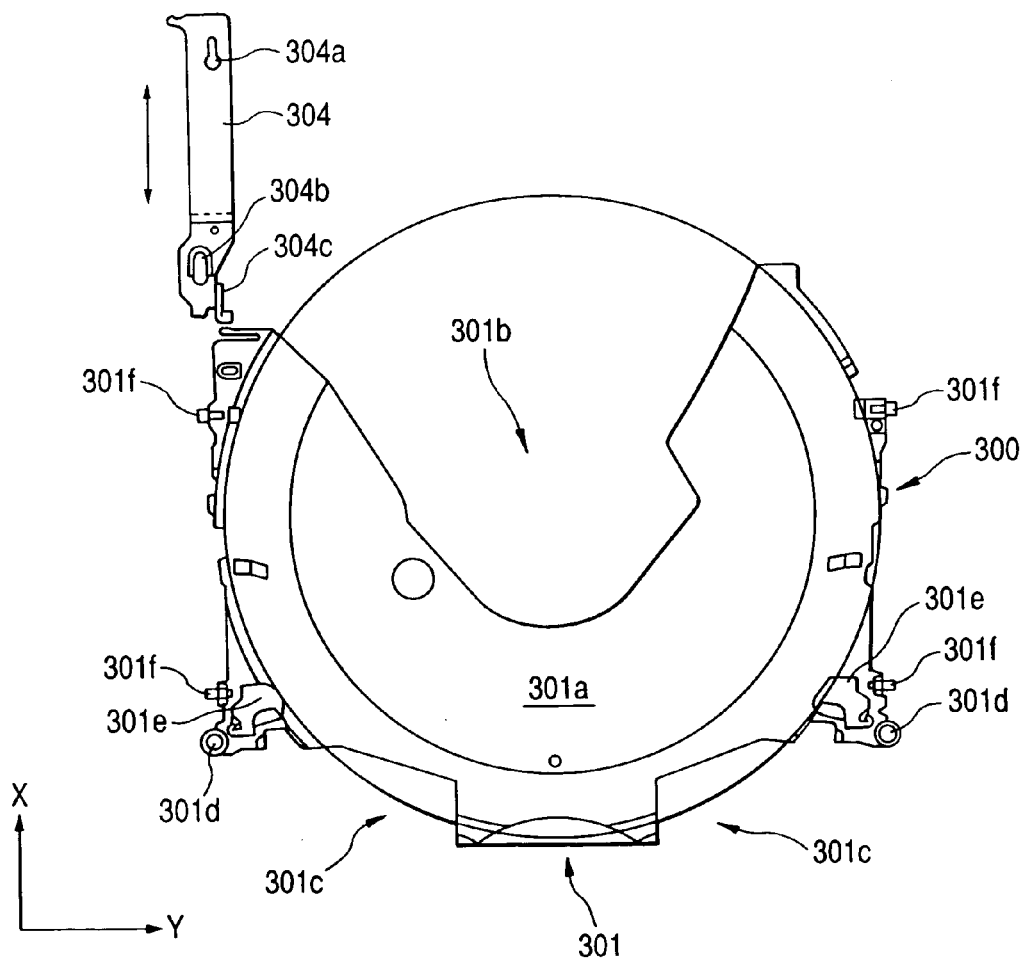
FIG. 5 is a plan view of the recording medium accommodation unit constructed as a module.

Next, the accommodation unit 300 will be explained by referring to FIGS. 1 and 2 and FIGS. 5 and 6. FIG. 5 is a plan view of the accommodation unit 300 constructed as a module or unit and FIG. 6 is a side view of the accommodation unit 300 as seen from one side.

At the front side in the playback device A is arranged the accommodation unit 300 that can be moved vertically and accommodate the recording mediums B in stack, as shown in FIG. 1. Trays 301, each capable of accommodating one recording medium B, are stacked in multiple layers so that they can be brought into or out of contact with one another in the vertical direction (Z direction).

Figure 6:
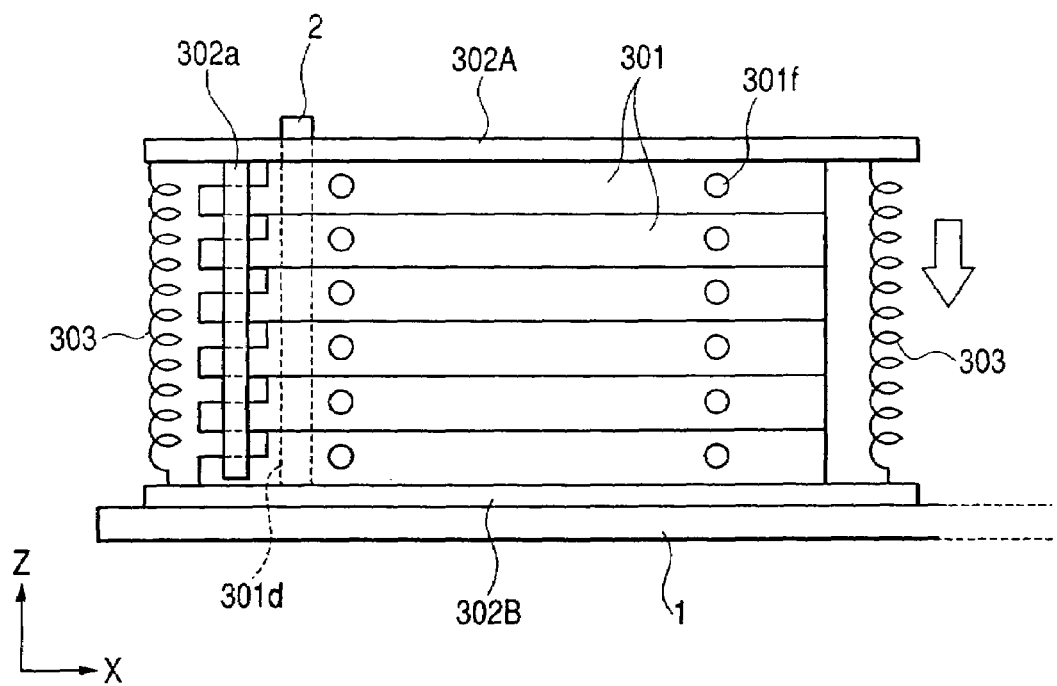
FIG. 6 is a side view, as seen from one side, of the recording medium accommodation unit constructed as a module.

As shown in FIG. 5 and FIG. 6, the accommodation unit 300 that accommodates the recording medium B loaded by the drive rollers 101 has a plurality of trays 301 of the same shape (in this case, six trays) stacked in the Z direction. Two guide shafts 2 projecting vertically upward from the bottom plate of the main chassis 1 pass through two insertion holes 301d formed in each tray 301 to restrict the movement of the trays 301 to the Z direction.

As shown in FIG. 5, the trays 301 are roughly V-shaped overall, and a support surface 301a is formed with notch portions 301b, 301c. The notch portion 301b covers a central area of the recording medium B supported by the support surface 301a. This notch portion allows a turntable 201, a clamper 202 and a pickup 203 of the carriage chassis 200 (shown in FIG. 2) to access this area so that the recording medium B can be played back at a position somewhat away from the support surface 301a.

The notch portions 301c are a pair of notches provided at the left and right of the front side of the tray 301. A pair of drive rollers 101 are allowed to enter into these areas. The drive rollers 101 that have entered into the notch portions 301c interfere with an area occupied by the recording medium B supported on the support surface 301a.

Reference number 301d in the figure represents holes through which the guide shafts 2 pass. Denoted 301e are retainer members that are urged in one direction by resilient members not shown. The retainer members 301e press against the peripheral edge of the recording medium B supported on the support surface 301a to prevent undesired motions of the recording medium B.

Reference number 301f denotes a total of four projections, two of them projecting from each side of the tray 301. These four projections 301f are applied the drive forces of four wedge members 410 (shown in FIG. 2) respectively to move the tray 301 in the direction of tray array. The constructions of the six trays are the same.

On the main chassis 1 of the playback device A is installed a tray retainer member 304 that can be moved back and forth and press against the edge of the tray 301. The tray retainer member 304 has two guide grooves 304a, 304b and an engagement portion 304c. The guide grooves 304a, 304b are engaged with a pin not shown which projects upward from the main chassis 1. As the recording medium B is inserted or removed, the pin is driven toward or away from the end portion of the tray 301 by a drive member not shown. The engagement portion 304c is provided at one end of the tray retainer member 304 and has a form of a riser plate member having a height covering the tray loading positions described later. The engagement portion 304c can be brought into or out of contact with the end of the tray 301.

As shown in FIG. 6, the accommodation unit 300 has the six trays 301 arranged in the Z direction so that the guide shafts 2 can pass through the insertion holes 301d formed in the trays 301. At the top of the trays 301 a restriction plate 302A is provided as a movable chassis, and at the bottom there is a restriction plate 302B secured to the main chassis 1 or a support chassis. The top and bottom restriction plates 302A, 302B clamp the six trays 301 therebetween. Further, these restriction plates 302A, 302B also have insertion holes through which to insert the guide shafts 2. The restriction plate 302B is secured to the main chassis 1, and coil springs 303 are disposed at a plurality of locations between the opposing surfaces of the restriction plate 302A and restriction plate 302B to urge the restriction plate 302A toward the restriction plate 302B, i.e., in the direction of arrow. The restriction plate 302A has a droop portion 302a that contacts the side of the trays 301 so that the trays 301 will not move inadvertently in the X or Y direction.

The provision of the restriction plates 302A, 302B facilitates the assembly of the accommodation unit 300. That is, the work for assembling the accommodation unit 300 into the main chassis involves only clamping the six trays 301 between the restriction plates 302A and 302B, setting the coil springs 303 to hold the trays in one block, fitting the block over the guide shafts 2, and securing the restriction plate 302B to the main chassis 1. This eliminates a troublesome step of sleeving one tray 301 over the guide shafts 2 at one time during the assembling process.

Figure 7:
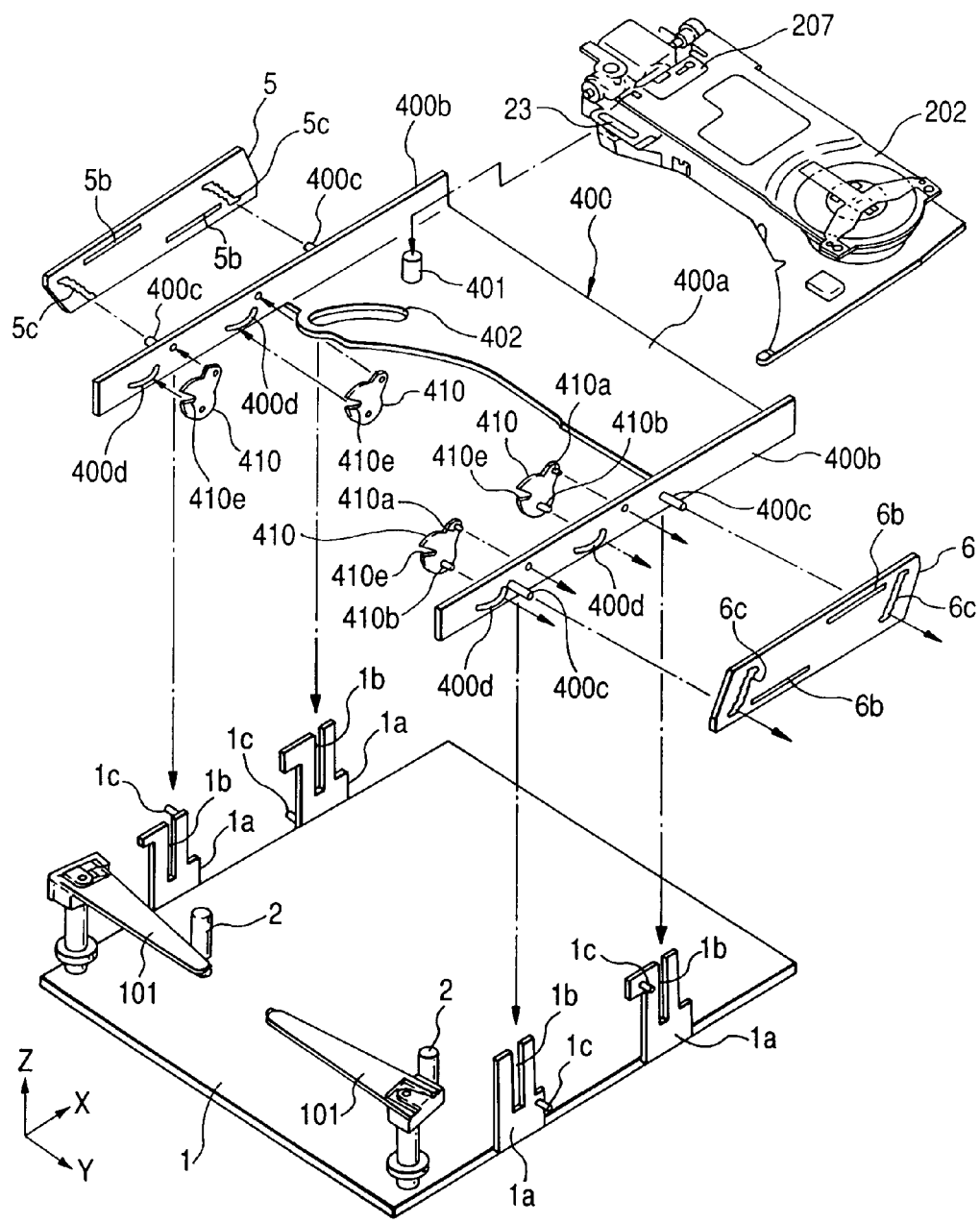
FIG. 7 is an exploded perspective view of a mechanism for vertically moving the movable chassis.
Figure 8:
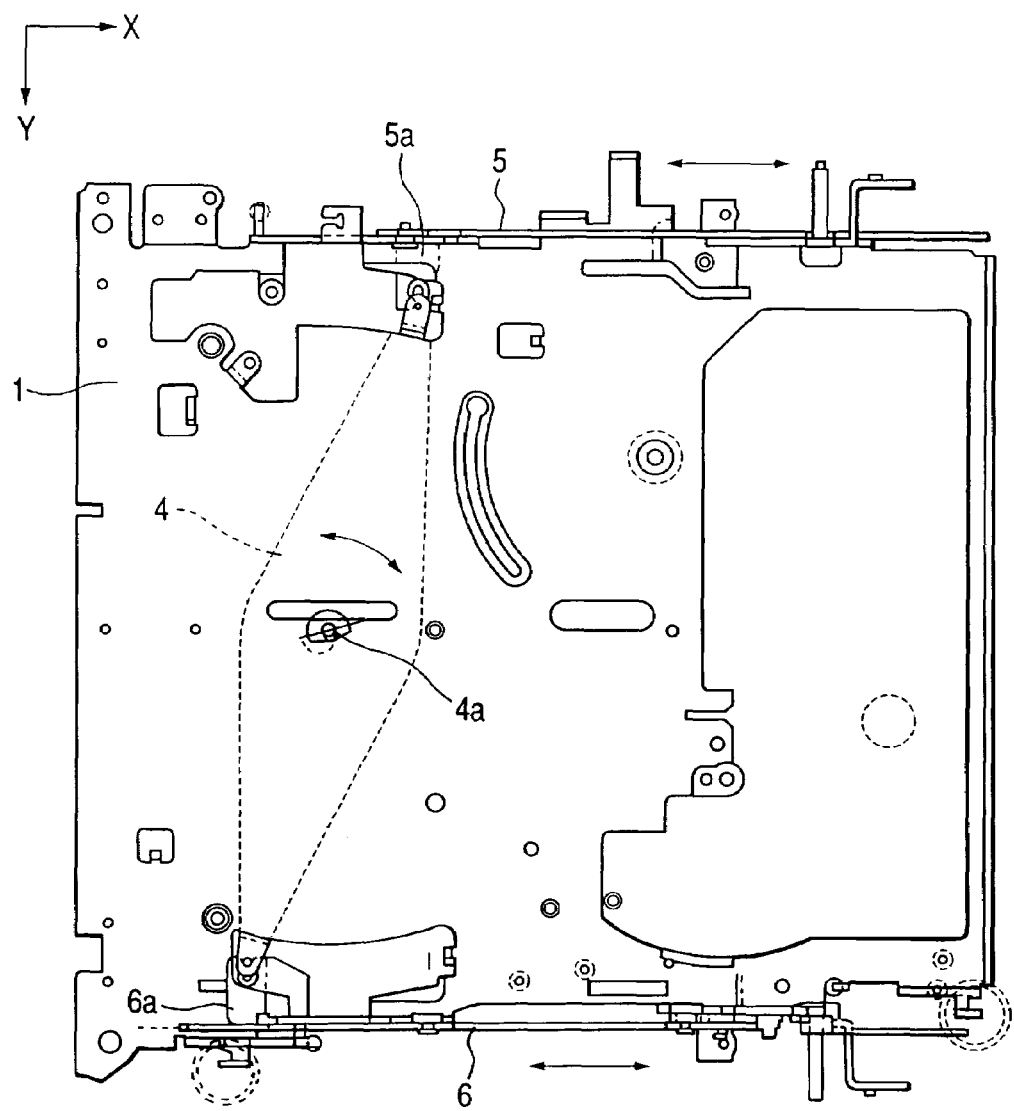
FIG. 8 is a bottom view of the main chassis.
Figure 9:
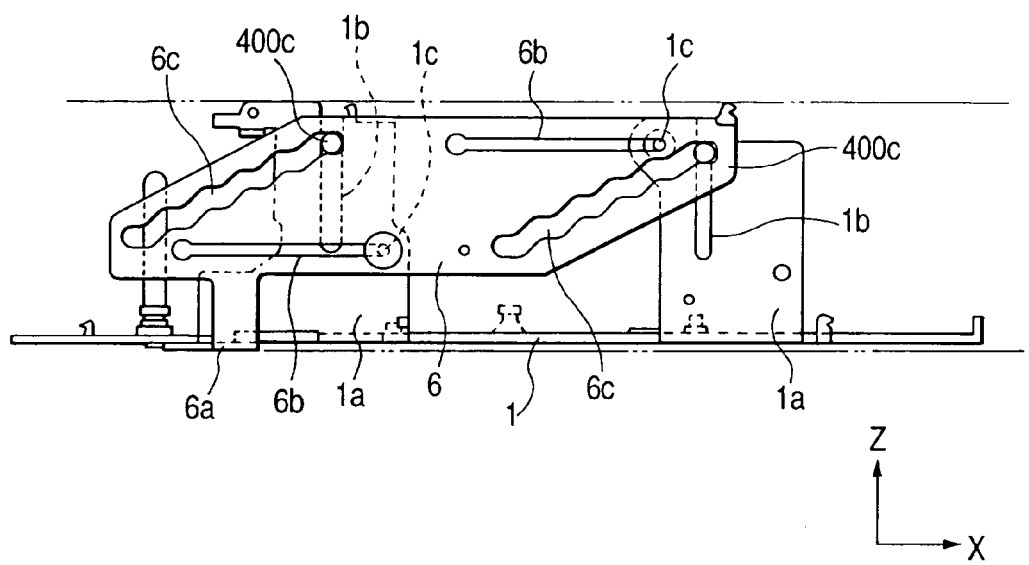
FIG. 9 is a schematic side view of the mechanism for vertically moving the movable chassis.
Figure 10:
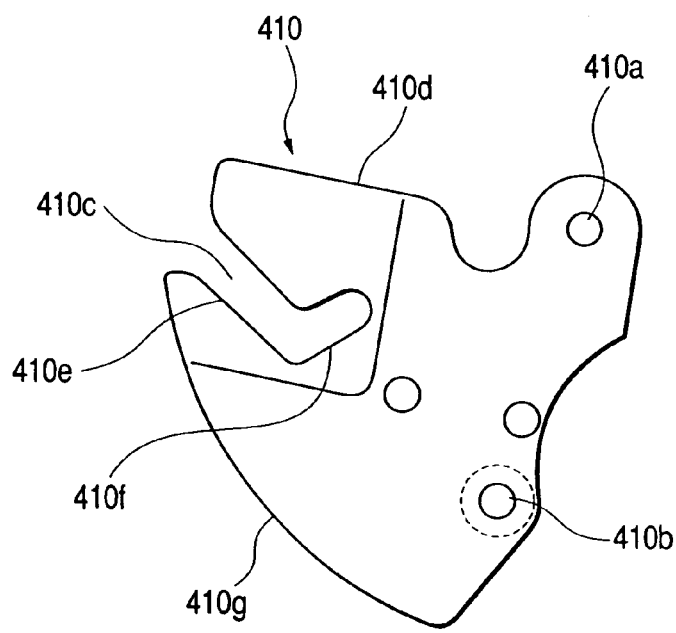
FIG. 10 is an explanatory view of the wedge member pivotally mounted to the movable chassis.

Next, the mechanism for vertically moving the movable chassis 400 will be explained by referring to FIGS. 7 to 10. FIG. 7 is an exploded perspective view of a mechanism for moving up or down the movable chassis 400. FIG. 8 is a bottom view of the main chassis 1. FIG. 9 is an outline side view of the mechanism for vertically moving the movable chassis 400. FIG. 10 is an explanatory diagram of the wedge member 410 attached pivotally to the movable chassis 400.

The movable chassis 400 is raised or lowered by the drive forces of the slide members 5, 6, which are arranged on the left and right outer sides of the main chassis 1 and movable in the longitudinal direction (X direction). On the movable chassis 400 is mounted the carriage chassis 200 that can be pivoted about a support shaft 401 by a movable pin 3 (shown in FIG. 2) driven along a arc slot 402.

The movable chassis 400, as shown in FIG. 7, has a flat plate portion 400a for supporting the carriage chassis 200 and a pair of riser plate portions 400b provided on each side of the flat plate portion 400a. On the inner sides of the riser plate portions 400b are pivotally mounted a total of four wedge members 410, two on each riser plate portion. These four wedge members 410 are pivoted synchronously by a drive mechanism not shown.

As shown in FIG. 8, on the upper surface of the bottom plate of the main chassis 1 is mounted a pivot arm 4 that can pivot about a fulcrum 4a. The pivot arm 4 is pivoted by the drive force of a motor not shown. A total of four riser plates 1a extending in the Z direction are provided on the left and right sides of the main chassis 1, with two riser plates on each side, as shown in FIG. 7. The slide members 5, 6 are attached to the riser plates 1a so that they can move in the X direction along the riser plates 1a. The slide members 5, 6 each have projecting pieces 5a, 6a projecting from the lower end portion thereof in the Y direction. The projecting pieces 5a, 6a are pivotally connected to the ends of the pivot arm 4. When the pivot arm 4 is pivoted by the drive force of the motor not shown, the slide members 5, 6 are moved oppositely along the X direction.

As shown in FIG. 9, the slide member 6 has two linear slots 6b extending in the X direction, in which pins 1c formed on the riser plates 1a of the main chassis 1 are fitted. This restricts the direction of motion of the slide member 6 to the X direction. The riser plates 1a are each formed with a guide slot 1b extending in the Z direction, in which a pin 400c formed on a pair of riser plate portions 400b of the movable chassis 400 is engaged (a total of four pins 400c are formed, two on each riser plate portion 400b). This restricts the direction of motion of the movable chassis 400 to the Z direction. Further, the pins 400c are also fitted in two stair-shaped inclined slots 6c formed in the slide member 6. When the slide member 6 moves in the X direction, the pins 400c are driven in the Z direction. The slide member 5 is formed with two inclined slots 5c (shown in FIG. 7) that are inclined in the opposite direction of the inclined slots 6c. Thus, the four pins 400c are driven along the direction of the inclined slots, moving up the movable chassis 400.

The inclined slots 5c, 6c are stair-shaped, having six steps. These steps position the movable chassis 400 at heights corresponding to the six trays.

FIG. 10 shows one of four wedge members 410 pivotally attached to the riser plate portions 400b of the movable chassis 400. The wedge member 410 is mounted to the riser plate portion 400b through a pivotal fulcrum 410b. The projection 410b fits into an arc slot 400d formed in the riser plate portion 400b. The arc slot 400d restricts the pivoting range of the wedge member 410. Designated 410c is a roughly L-shaped slot, into which the projection 301f of the tray 301 is fitted. Designated 410d, 410e, 410f and 410g are cam surfaces that engage the projection 301f of the tray 301. The four wedge members 410 are pivoted synchronously by an interlock mechanism not shown, as described earlier.

Figure 11:
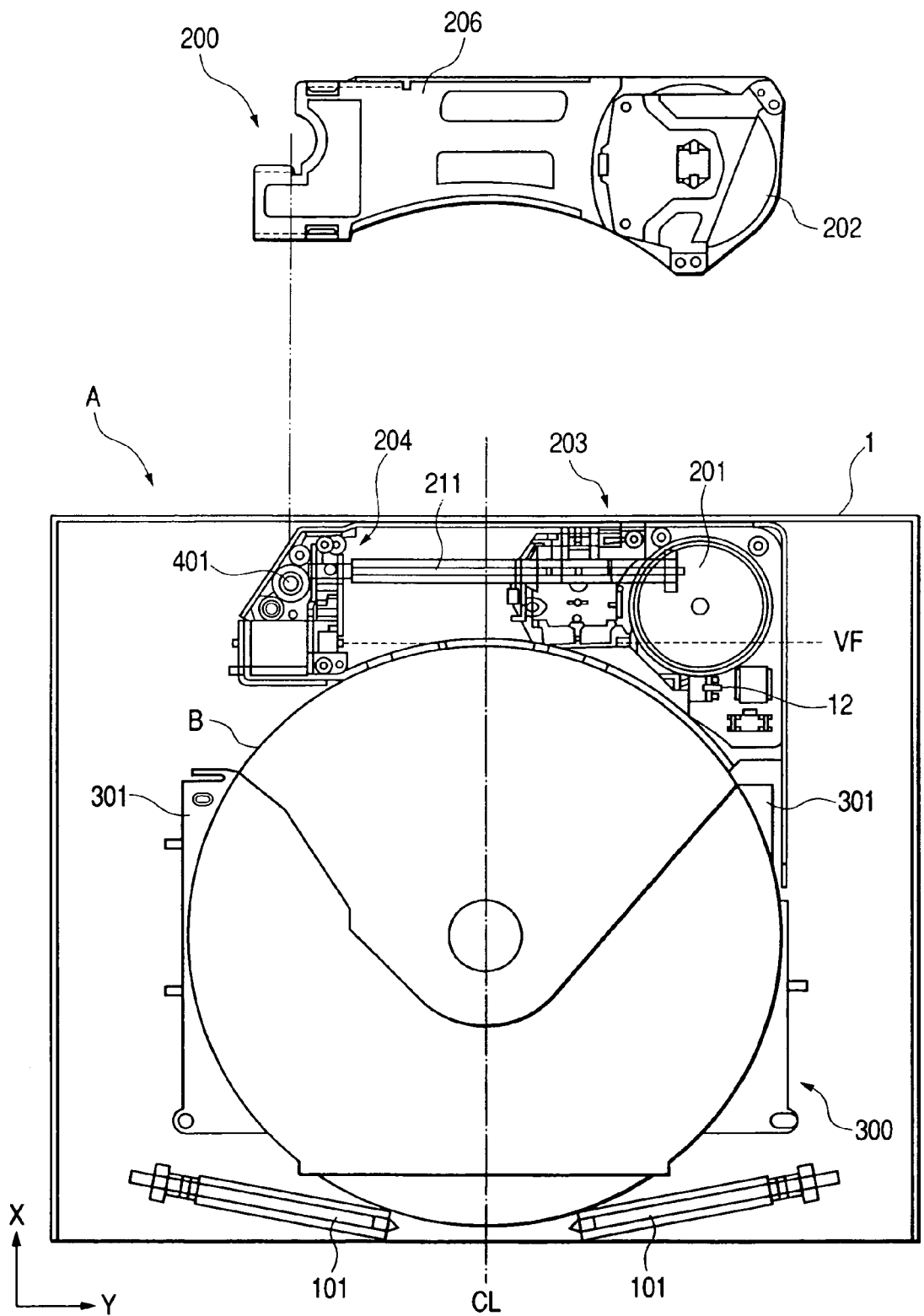
FIG. 11 is an exploded plan view showing a carriage chassis situated in the rear part of the recording medium playback device.

Next, the carriage chassis 200 will be described by referring to FIGS. 11 through 13. FIG. 11 is an exploded plan view of the carriage chassis 200 located in the rear part of the playback device A (when the side where the insertion opening 11 is located is taken as a front side). FIG. 12 is a plan view and a front view of the carriage chassis 200. FIG. 13 is a side view and a bottom view of the pickup 203.

In this embodiment, the carriage chassis 200 is standing by when it is located in the rear part of the playback device A as shown in FIG. 11. The carriage chassis 200 has a turntable 201, a clamper 202, a pickup 203 and a pickup moving mechanism 204. When the carriage chassis 200 is in the standby state, the pickup 203 and turntable 201 are on a vertical tangential plane VF (indicated by a dotted line), which is tangent to the outer circumferential edge of the recording medium B placed on the tray 301 on the side of the carriage chassis 200, at a point where the outer circumferential edge is intersected by the loading center line CL of the recording medium B (indicated by a chain-dotted line). That is, when the carriage chassis 200 is in the standby state, the pickup 203 is located at a position where it does not contact the recording medium B placed on the tray 301 (for example, near the turntable 201). The turntable 201, too, is fixed at a position where it is out of contact with the recording medium B placed on the tray 301 when the carriage chassis 200 is in the standby state.

The turntable 201 is located on one end of a base 205 arranged at a lower part of the carriage chassis 200, and centers and carries thereon the recording medium B loaded into the tray 301. The turntable 201 is pivoted by a drive motor (not shown).

The clamper 202 clamps the recording medium B from above and is arranged on one end of a clamper base 206 disposed at an upper part of the carriage chassis 200. The clamper base 206 has a support shaft 207 inserted through the other end thereof, as shown in FIG. 12B. The clamper base 206 is pivotally supported on the support shaft 207 so that the one end of the clamper base 206 can be moved toward or away from the base 205.

Figure 12A:
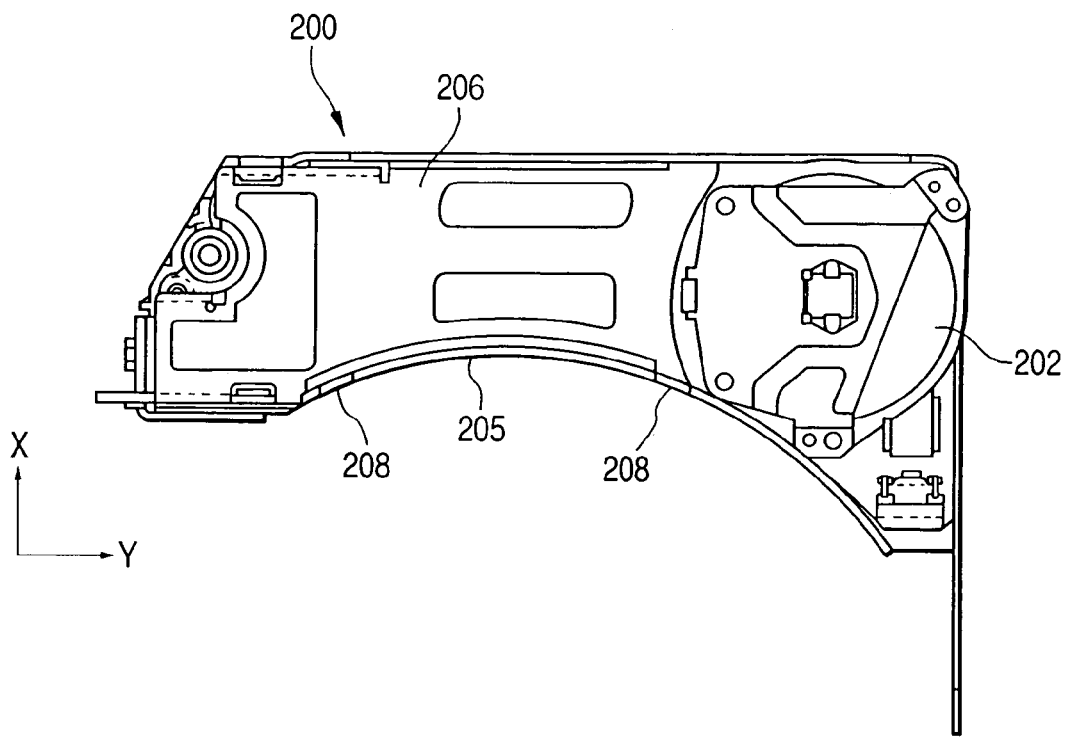
FIG. 12A is a plan view of the carriage chassis.
Figure 12B:
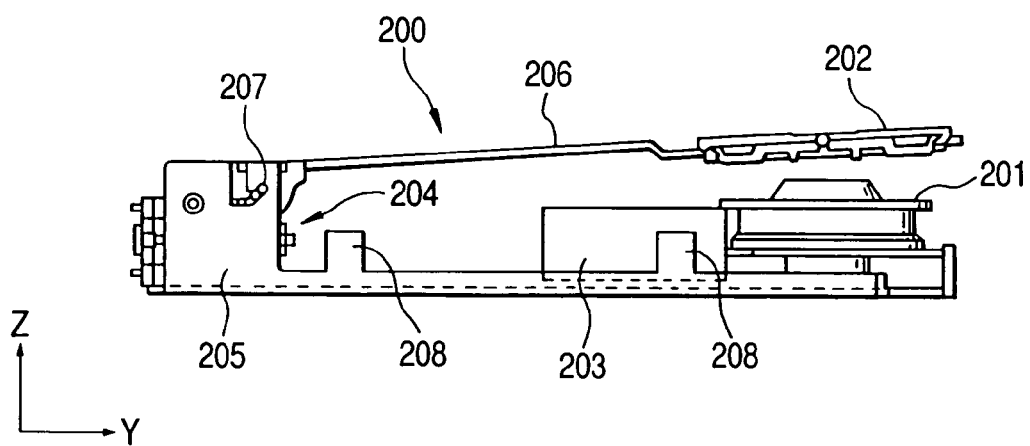
FIG. 12B is a front view of the carriage chassis.

The front edges of the base 205 and the clamper base 206 on the recording medium B side are curved in the X direction to maintain a minimum clearance from the outer circumferential edge of the recording medium B, as shown in FIG. 12A. This curved configuration is hereinafter referred to as a curved geometry and the front edge side where the base 205 and clamper base 206 are curved is called a curved geometry side in the following description. The front edge of the base 205 has a plurality (two in this case) of stoppers 208 erected at predetermined locations, as shown in FIG. 12B. The recording medium B loaded by the drive rollers 101 abuts against these stoppers 208, thereby preventing an excess loading motion of the recording medium B. The stoppers 208 are erected at locations that are not on the loading center line CL of the recording medium B and where they do not interfere with the pickup 203.

The curved geometry of the base 205 and clamper base 206 is so set that, as shown in FIG. 11, the X-direction width is most constricted near the loading center line CL of the recording medium B. With this geometry, as the pickup 203 is moved in the radial direction of the recording medium B by the pickup moving mechanism 204 and passes the most constricted width portion, the pickup 203 is exposed on the curved geometry side from the carriage chassis 200.

On the base 205 are mounted the turntable 201 for carrying thereon and rotating the recording medium B, the pickup 203 for playing back the information recorded surface of the recording medium B, and the pickup moving mechanism 204 having a drive motor for reciprocally moving the pickup 203 in the radial direction of the recording medium B.

Figure 13A:
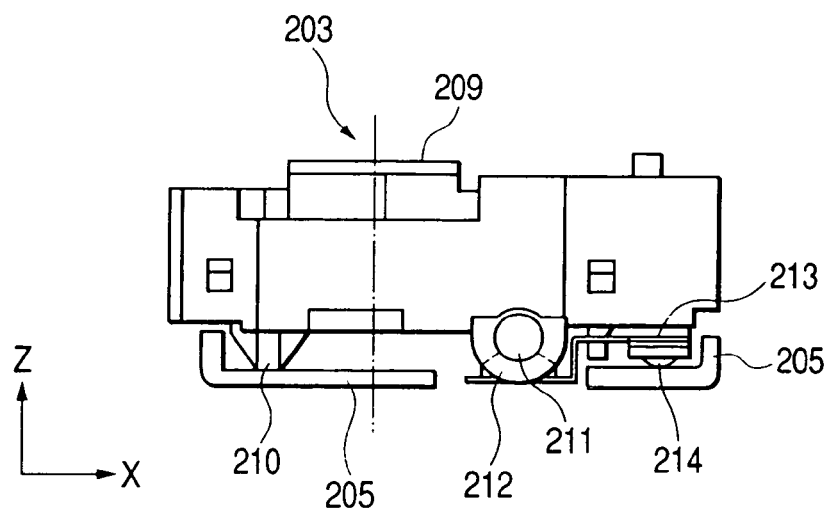
FIG. 13A is a side view of the pickup.

On the upper side of the pickup 203 is mounted an objective 209 for reading information recorded on the recording medium B, as shown in FIG. 13A.

Figure 13B:
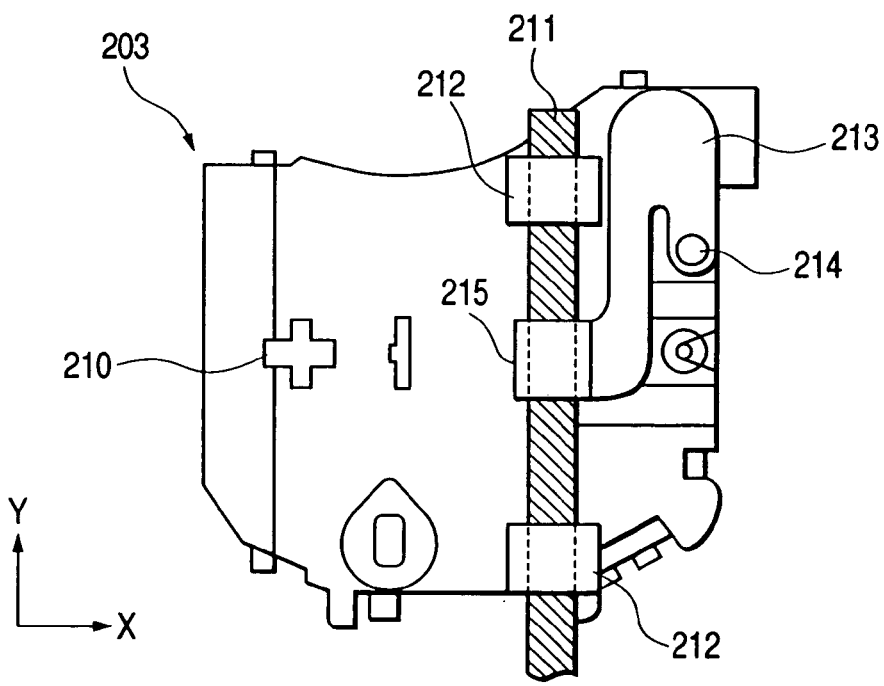
FIG. 13B is a bottom view.

On the lower side of the pickup 203 there are a guide member 210 projecting a predetermined distance downwardly, a feed screw 211 rotated by the drive force of the drive motor, a plurality of support members 212 meshing with and supporting the feed screw 211 (in this embodiment, two support members as shown in FIG. 13B), and a leaf spring 213 urging the feed screw 211 upward.

The guide member 210, drive motor, feed screw 211, support members 212 and leaf spring 213 combine to form the pickup moving mechanism 204. The feed screw 211 is driven by the drive motor installed in the pickup moving mechanism 204. When the feed screw 211 in mesh with the support members 212 is rotated in the forward and backward directions by the drive motor, the pickup 203 is reciprocally moved in the radial direction of the recording medium B.

The guide member 210 and the feed screw 211 are located a predetermined distance from the center axis (indicated by a chain-dotted line in FIG. 13A) of the objective 209. The guide member 210 is situated at a position equidistant from the two support members 212. This arrangement enables the pickup 203 to be supported at three points on the base 205 by the guide member 210 and the two support members 212 so that the pickup 203 can easily be skew-adjusted when it is reciprocally moved in the radial direction of the recording medium B.

The front end portion of the guide member 210 is formed spherical and in sliding contact with the base 205 to support the pickup 203. Hence, the front end portion of the guide member 210 has a point contact with the base 205 and thus can reduce a frictional resistance generated by the pickup 203 moving on the base 205, thereby allowing the pickup 203 to be reciprocated smoothly in the radial direction of the recording medium B. Further, at one end portion of the leaf spring 213 attached to the pickup 203 is arranged a projecting portion 214 that projects a predetermined distance downwardly. The projecting portion 214 is in sliding contact with the base 205 to support the pickup 203.

The leaf spring 213 urges the feed screw 211 upward (in the Z direction of FIG. 13A) by the other end portion 215, with the projecting portion 214 working as a fulcrum. Applied with this urging force, the guide member 210 is urged downwardly (opposite the direction in which the feed screw 211 is urged). With these forces, the pickup 203 is stably mounted on the base 205, thus preventing inadvertent motions of the pickup 203 when it is moved in the radial direction of the recording medium B by the rotation of the feed screw 211. The other end portion 215 is applied with resin at a surface in sliding contact with the feed screw 211 to reduce the frictional resistance.

Because the pickup moving mechanism 204 (guide member 210, feed screw 211, support members 212 and leaf spring 213) is installed on the bottom side of, and within the X-direction width of, the pickup 203, it is possible to have the X-direction width of the carriage chassis 200 most constricted at a position near the loading center line CL of the recording medium B, i.e., to make the width of that portion smaller than the X-direction width of the pickup 203.

A detecting member 12 mounted on the base 205 near the turntable 201 detects the innermost circumferential position of the recording medium B so that the pickup 203 can reliably be stopped at that position (shown in FIG. 11).

When the carriage chassis 200 with the above construction is situated at the standby position, the outer circumferential edge of the recording medium B placed on the tray 301 on the side of the carriage chassis 200 overlaps the curved geometry side of the pickup 203 and turntable 201 over a predetermined distance, as shown in FIG. 11. That is, the curved geometry side of the pickup 203 and turntable 201 is placed on the vertical tangential plane VF.

As a result, the recording medium B on the tray 301 can be put closer to the carriage chassis 200 side. Further, when the carriage chassis 200 is at the standby position, the pickup 203 and turntable 201 are located where they are not in contact with the tray 301. Therefore, the recording medium B, though overlapped, does not abut against the pickup 203 and turntable 201, making it possible to minimize the clearance between the recording medium B placed on the tray 301 and the carriage chassis 200, without causing any trouble during loading and playback. This in turn allows the longitudinal depth of the playback device A to be reduced. The possible time the carriage chassis 200 is in the standby state is when the user inserts the recording medium B into the accommodation unit 300 but has not yet demanded a playback of the recording medium B, or the playback of the recording medium B has finished.

Figure 14:
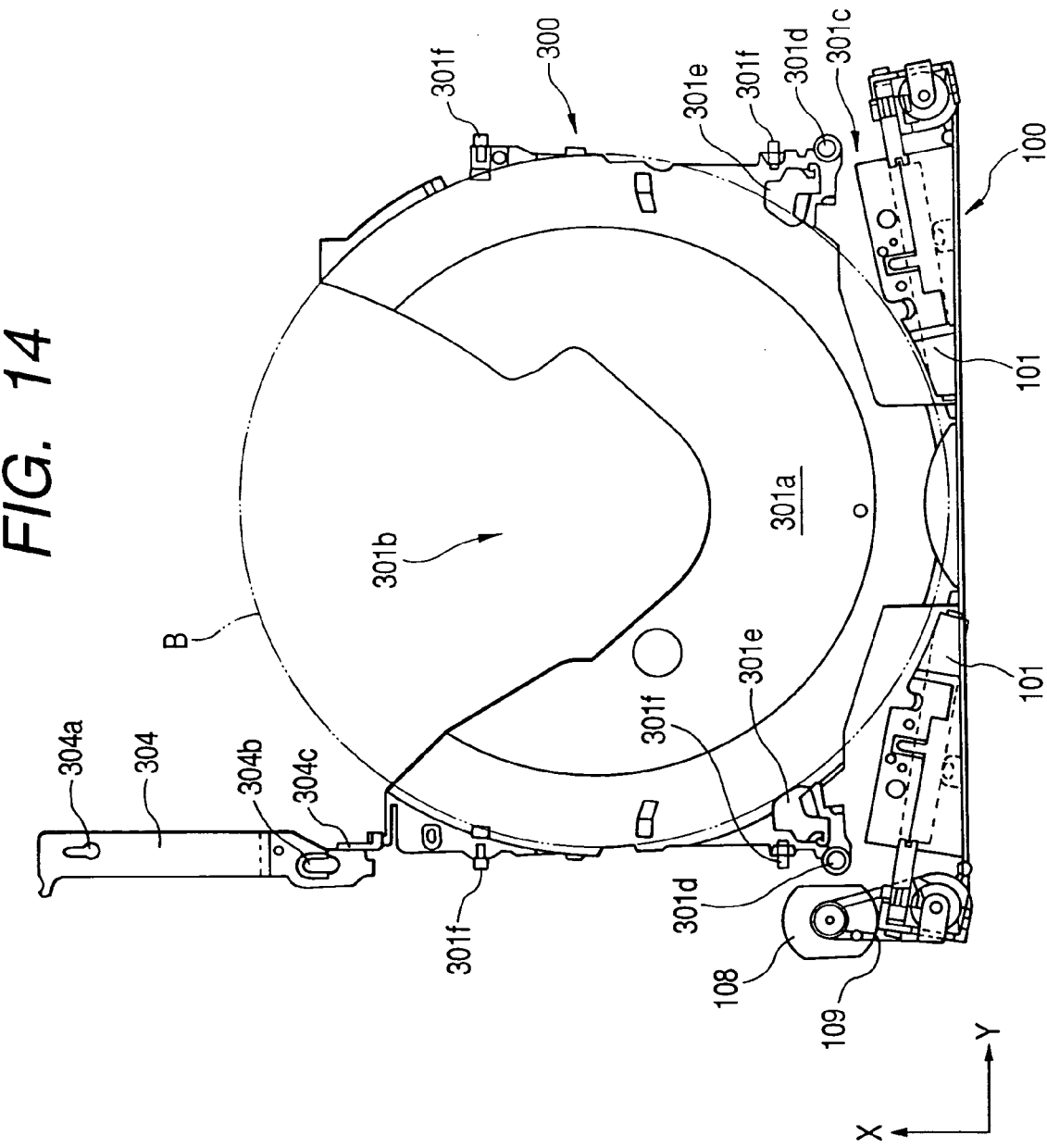
FIG. 14 is a plan view of the drive rollers in a retracted position.
Figure 15:
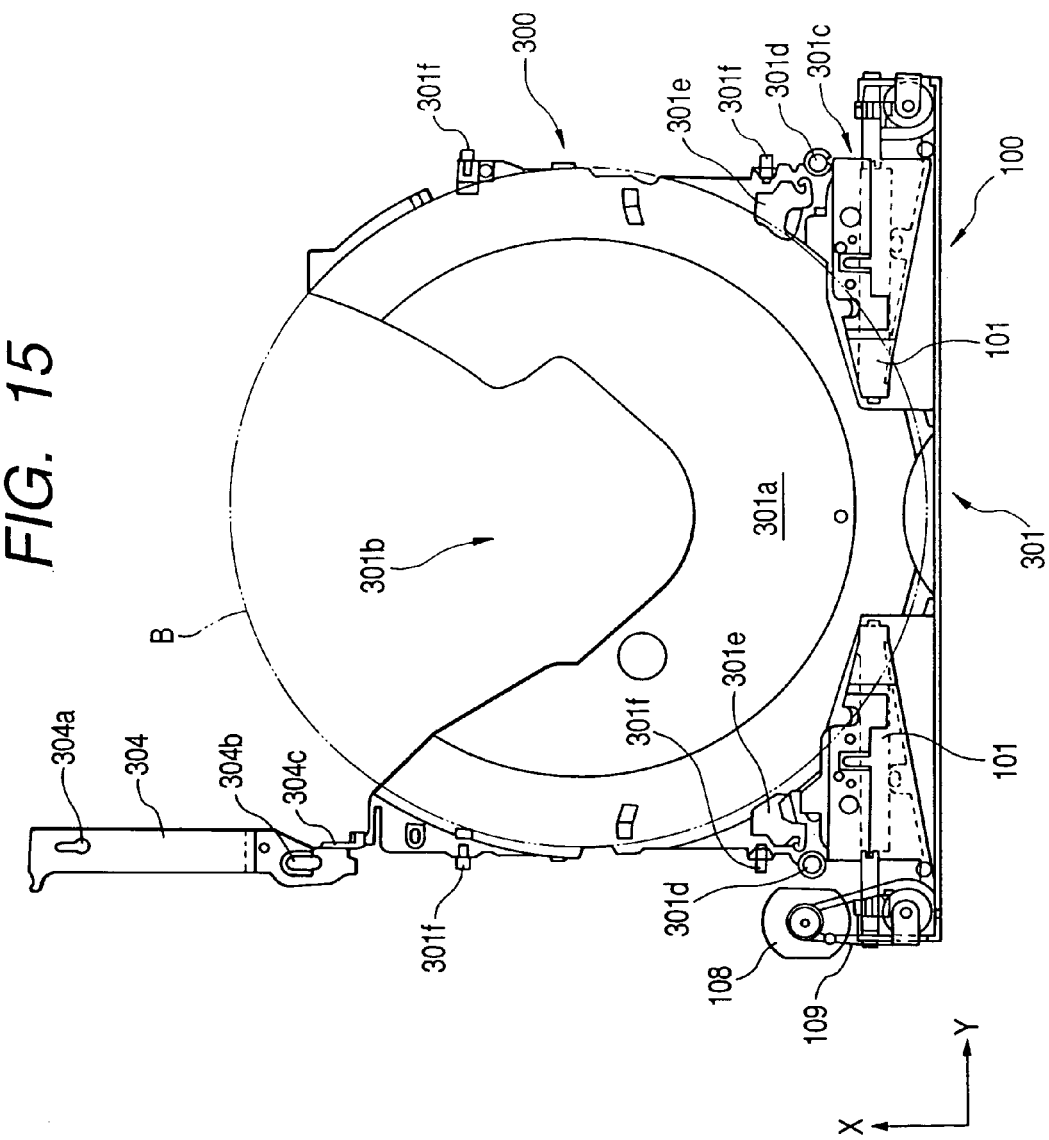
FIG. 15 is a plan view of the drive rollers in a loading position.

Next, the operation of the playback device A applying the present invention will be described by referring to FIGS. 14 through 24. In these figures, too, the direction in which the recording medium B is loaded is taken as the X direction, the direction in which to clamp the recording medium B is taken as the Z direction, and the direction perpendicular to the X and Z directions is taken as the Y direction. FIG. 14 is a plan view of the drive rollers 101 in a retracted position. FIG. 15 is a plan view of the drive rollers 101 in a loading position. FIGS. 16 to 23 are side views showing the height position of the tray 301 corresponding to the operation of the slide member 6 (slide member 5) and the wedge members 410. FIG. 24 is a plan view showing the operation of the carriage chassis 200. In the following, we will explain about a case in which the recording medium B loaded from the insertion opening 11 is installed into the second tray 301 from the bottom.

In a state before the recording medium B is loaded from the insertion opening 11 of the energized playback device A, the drive rollers 101 are in the retracted position where they are outside the notch portions 301c of the tray 301, as shown in FIG. 14. At this time, the drive rollers 101 are not parallel to the insertion opening 11 of the recording medium B and situated outside an area to be occupied by the recording medium B supported on the support surface 301a of the tray 301. In this condition, the tray retainer member 304 is slid along the guide grooves 304a, 304b by a drive member to engage the end of the tray 301 to prevent it from moving undesirably.

When the recording medium B is to be played back, the drive rollers 101 are also put in the retracted position not to interfere with the playback operation.

Figure 16:
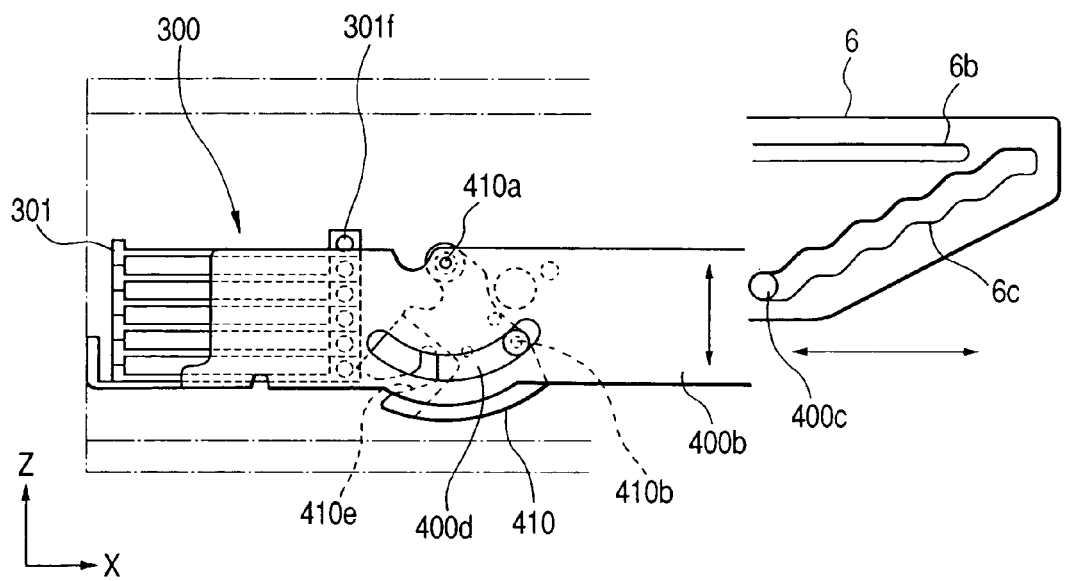
FIG. 16 is an explanatory diagram of the recording medium playback device.

In the state before the accommodation unit 300 accommodates the recording medium B, the six trays 301 are stacked, as shown in FIG. 16. At this time, the pins 400c are located at the lowest step of the inclined slot 6c and the movable chassis 400 is situated at the lowest position. The wedge members 410 are retracted to the positions away from the trays 301 so that when the movable chassis 400 is moved vertically, the wedge members 410 do not abut against the tray 301.

In the standby state of the carriage chassis 200, the pickup 203 of the carriage chassis 200 is moved by the pickup moving mechanism 204 to a position corresponding to the innermost circumferential edge of the recording medium B, i.e., to near the turntable 201, as shown in FIG. 11.

The user activates a control means not shown to install the recording medium B to the second lowest tray 301.

Figure 17:
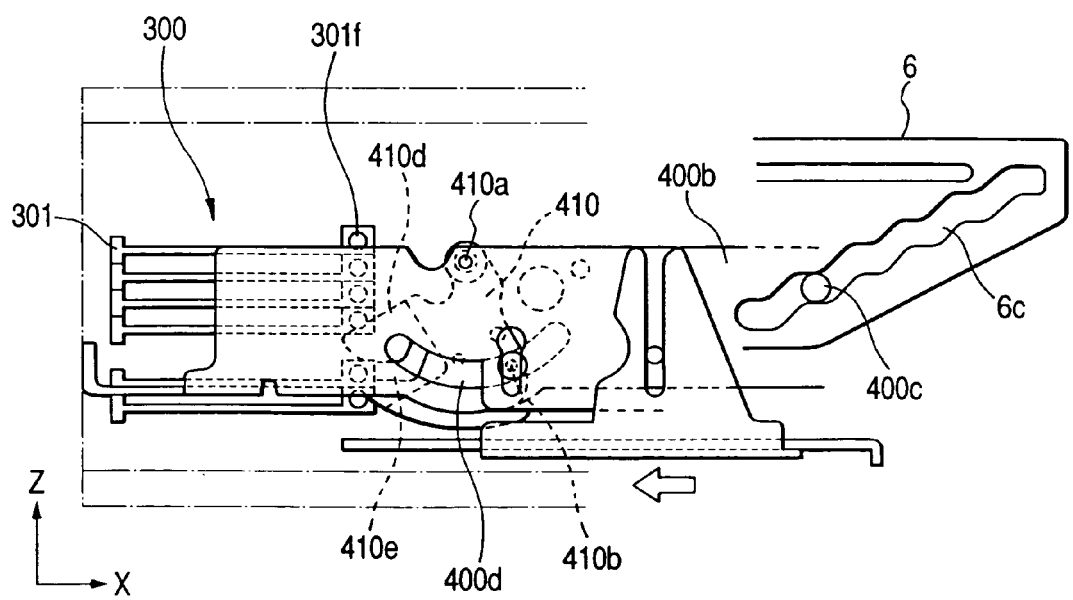
FIG. 17 is an explanatory diagram of the recording medium playback device.
Figure 18:
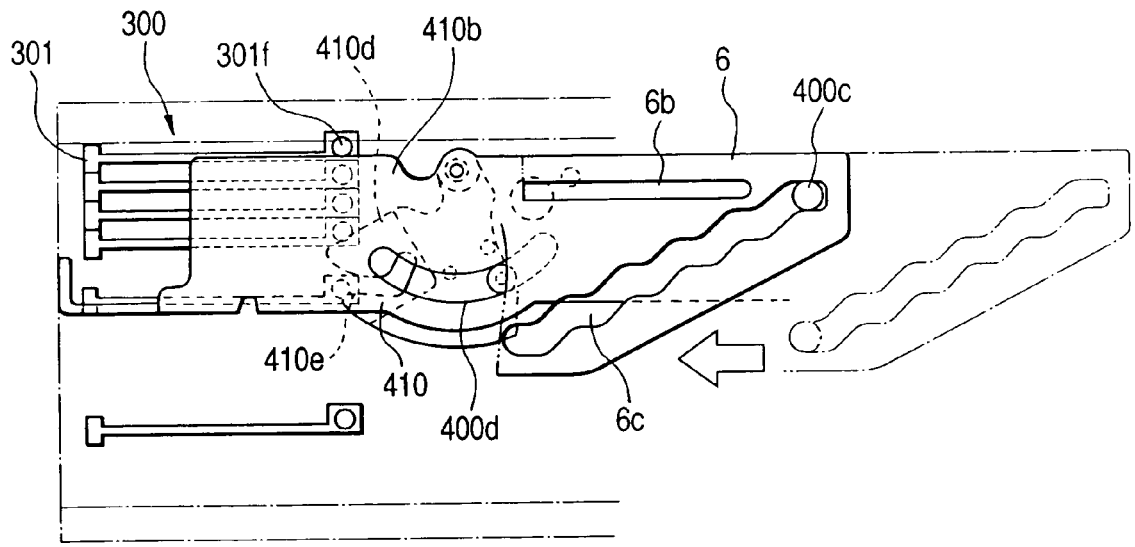
FIG. 18 is an explanatory diagram of the recording medium playback device.

Then, as shown in FIG. 17, the slide member 6 (slide member 5) is driven to raise the movable chassis 400. When the pins 400c are positioned at the second lowest step in the inclined slot 6c, the movable chassis 400 stops. At this height the wedge members 410 can hold the second lowest tray 301.

As described above, six steps in the inclined slot 6c correspond to the height positions of the six trays 301 shown in FIG. 16 before the recording medium B is accommodated into the accommodation unit 300. So, when a fourth lowest tray 301 is to be held by the wedge members 410, the movable chassis 400 needs to be positioned at the fourth lowest step in the inclined slot 6c.

Next, the operation to hold the second lowest tray 301 by the wedge members 410 is performed. As the wedge members 410 are pivoted clockwise in the figure, the cam surface 410d pushes up the projections 301f of the third lowest tray 301 to move the four trays 301, third lowest to sixth lowest, upward. At the same time, the projections 301f of the second lowest tray 301 ride over the cam surface 410e into the slot 410c. As a result, the second lowest tray 301 is held by the wedge members 410.

Next, the slide member 6 (slide member 5) is driven to raise the movable chassis 400. The third lowest to sixth lowest tray 301 are moved up by the cam surface 410d and at the same time the second lowest tray 301 is also moved up by the cam surface 410e, leaving only the bottom tray 301 in the standby position. The movable chassis 400 stops when the pins 400c are positioned at the highest step of the inclined slot 6c. The second lowest tray 301 is held by the wedge members 410 at a position corresponding to the uppermost height position of the movable chassis 400. This height corresponds to the height of the drive rollers 101 of the loading mechanism 100 and the loading and unloading of the recording medium are performed at this height position.

Figure 23A:
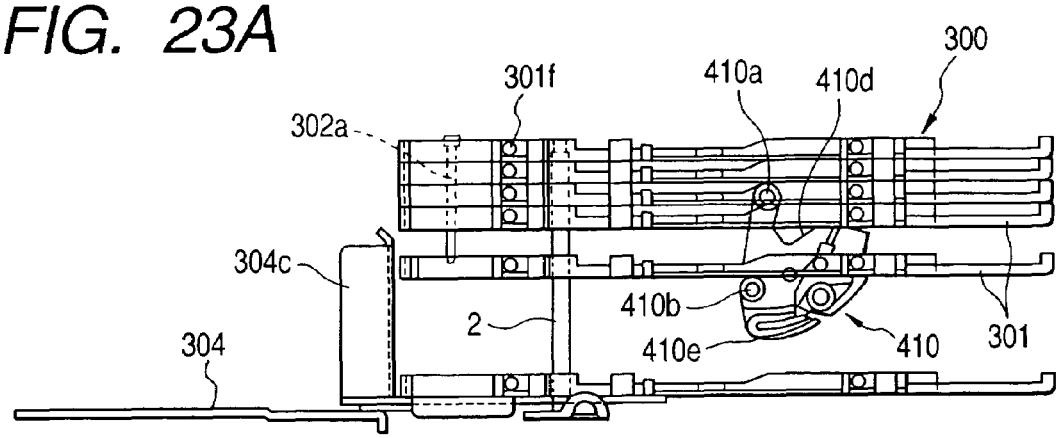
FIGS. 23A–23C are explantory diagrams of the recording medium playback device.
Figure 23B:
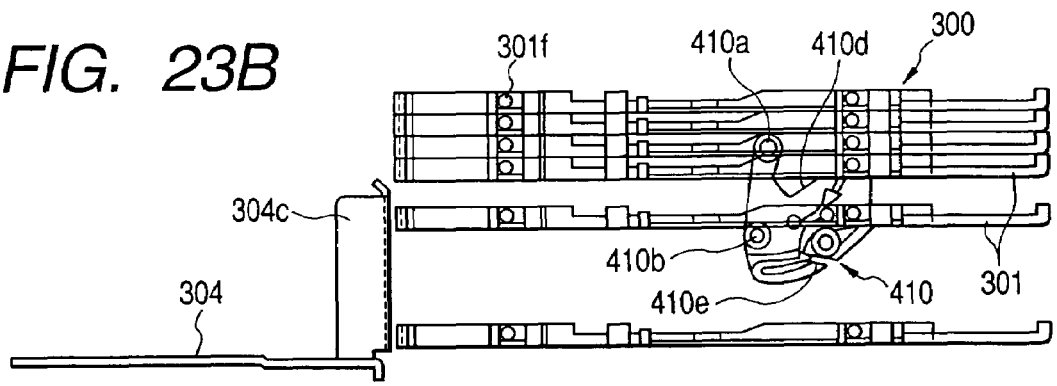
Figure 24:
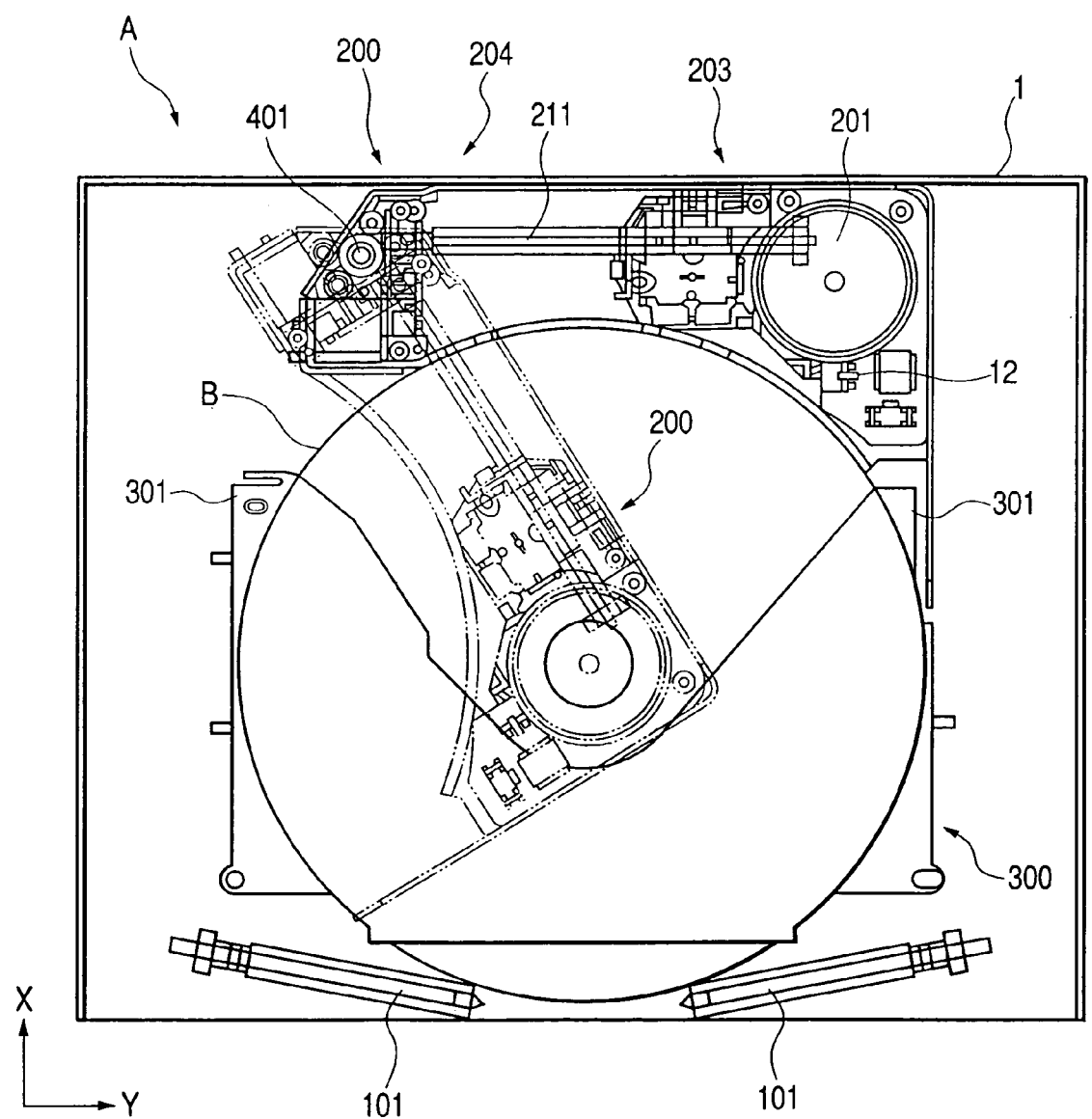
FIG. 24 is a plan view showing a pivoting action of the carriage chassis.
Figure 25:
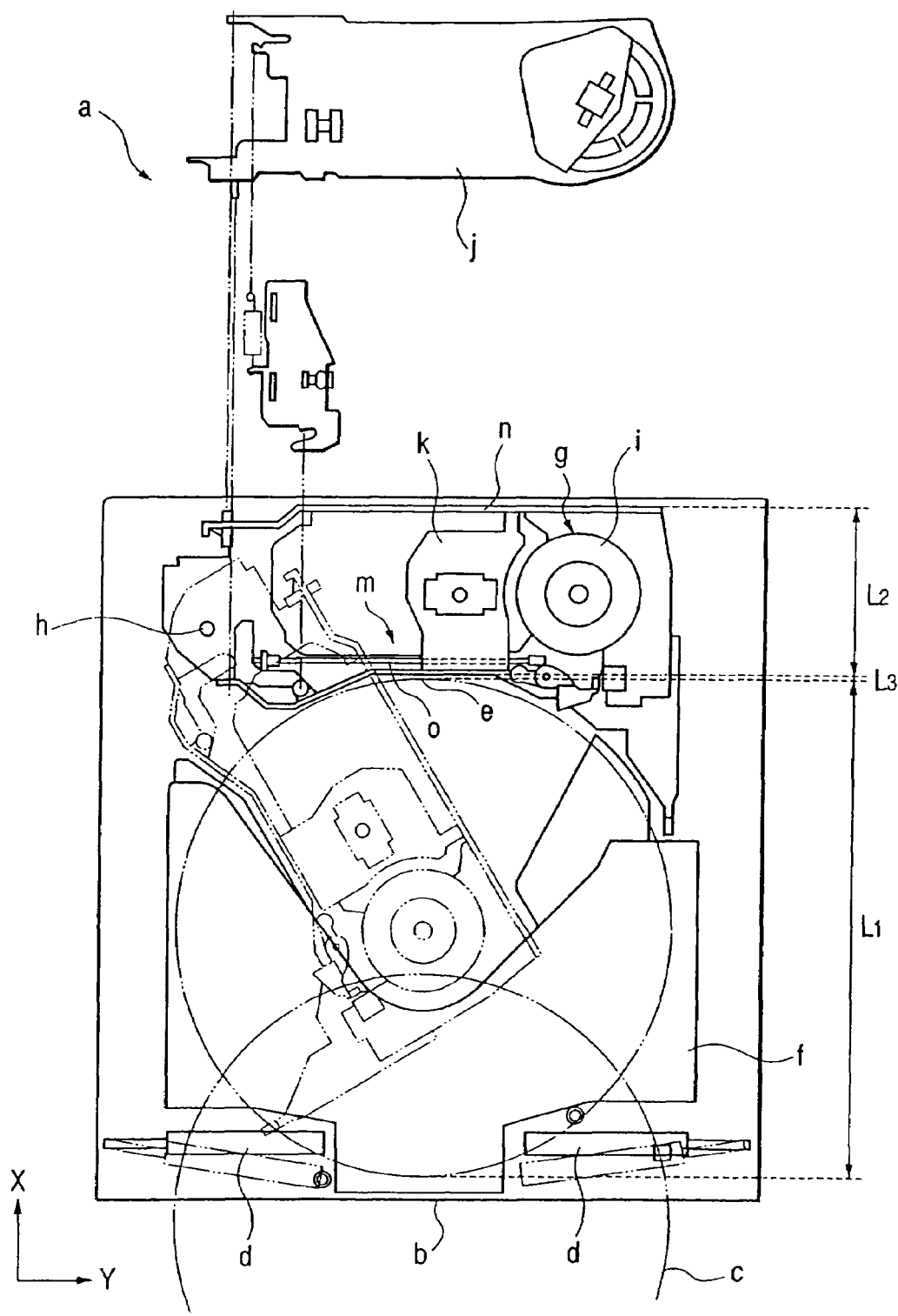
FIG. 25 is a plan view showing a conventional recording medium playback device.

In the above state, the tray retainer member 304 remains in the state where the sliding motion is not yet started (see FIG. 23B).

Figure 19:
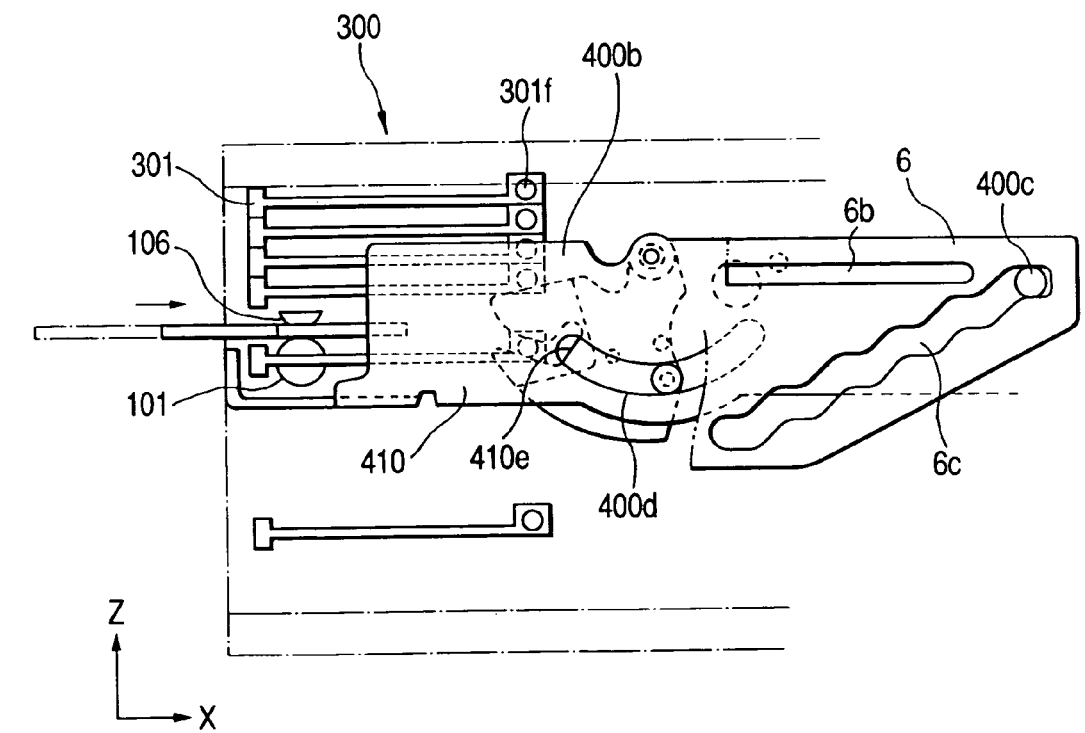
FIG. 19 is an explanatory diagram of the recording medium playback device.

Next, as shown in FIG. 19, the wedge members 410 are pivoted slightly clockwise. Although the second lowest tray 301 held by the wedge members 410 does not change in position, the third lowest to sixth lowest tray 301 are pushed slightly upward by the cam surface 410d. As a result, a space is secured between the trays 301 for the drive rollers 101 to enter. Then, the drive rollers 101 are moved from the retracted position (shown in FIG. 14) into the loading position (shown in FIG. 15), where the drive rollers 101 can load the recording medium B from the insertion opening 11.

At this time, the tray retainer member 304 is slid to engage its engagement portion 304c with the end of the tray 301. The tray retainer member 304 held against the end of the tray 301 can prevent the tray 301 that has completed the loading operation from moving inadvertently and at the same time improve the tray position precision during loading operation.

At the same time, the tray retainer member 304 engages also with the end of the lowest tray 301 which is simply sleeved over the guide shafts 2, so the lowest tray 301 can also be prevented from moving undesirably.

Figure 23C:
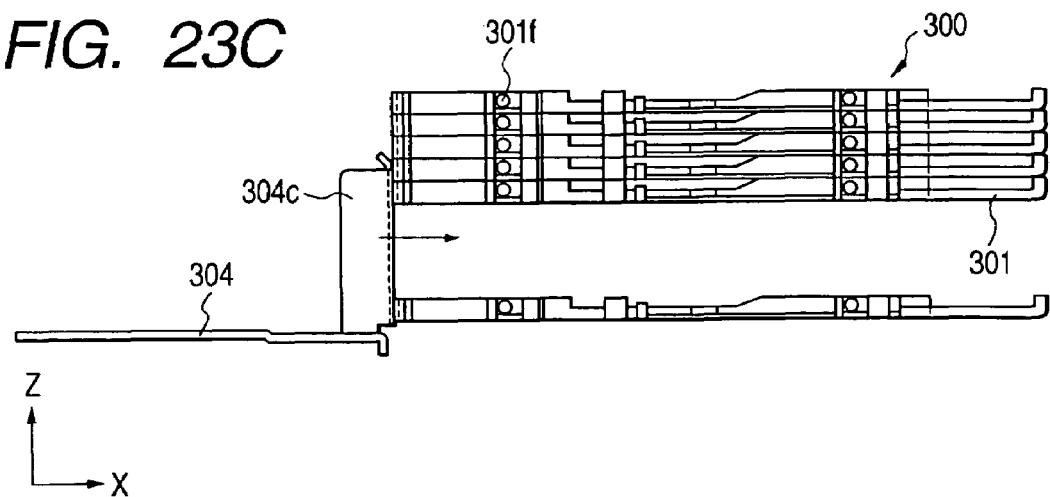

The other trays 301 situated above have their side surfaces in contact with the droop portion 302a of the restriction plate 302A and thereby restricted not to move in the X and Y directions (see FIG. 23C).

When one of the photosensors detects when the user inserts the recording medium B from the insertion opening 11, the drive rollers 101 at the loading position are synchronously rotated to start loading the recording medium B (shown in FIG. 19). In this state, if the photosensor switch is not activated, it is decided that the recording medium being loaded is a small-diameter recording medium. The recording medium is then discharged from the playback device A.

The recording medium B being loaded or unloaded in this manner is detected by the other photosensor. When these two photosensors determine that the loading of the recording medium B has been completed, the drive rollers 101 are stopped.

When the drive rollers 101 are in the loading position, they are in the notch portions 301c of the tray 301, as shown in FIG. 15. At this time, because the drive rollers 101 are oriented in the Y direction and parallel to the insertion opening 11, their drive force is directed in the recording medium loading direction (X direction). Further, at this time the drive rollers 101 are in the area that is to be occupied by the recording medium B placed on the support surface 301a of the tray 301 and thus can interfere with the recording medium B in the Z direction. In the above state, the tray retainer member 304 engages with the end of the tray 301.

Figure 20:
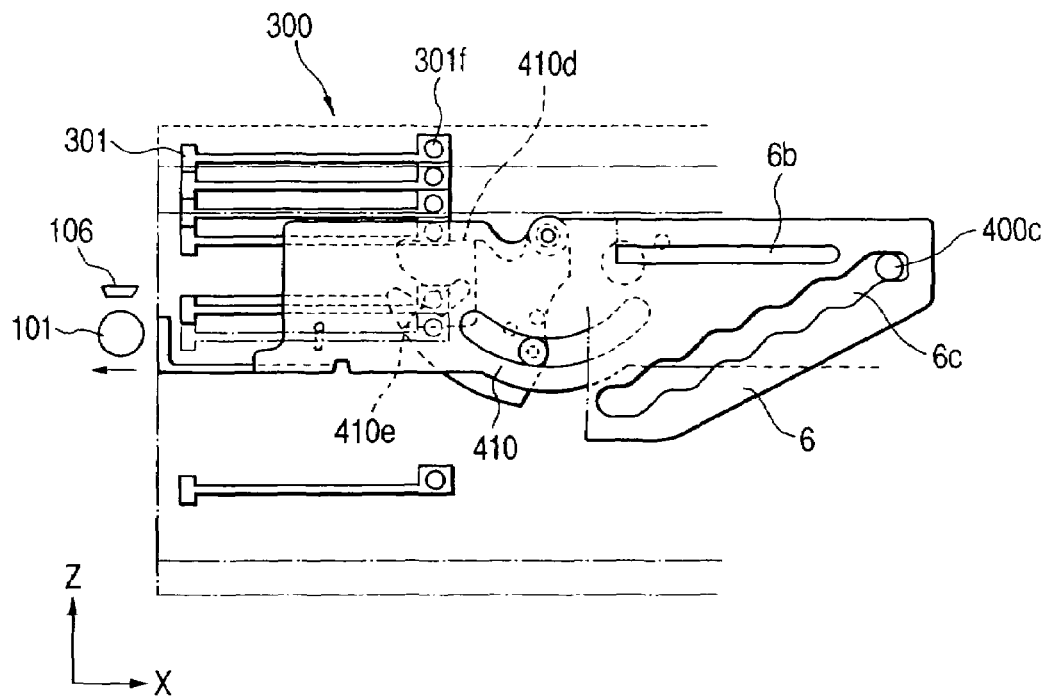
FIG. 20 is an explanatory diagram of the recording medium playback device.

Then, the recording medium B is loaded to a position directly above the second lowest tray 301 and its outer circumferential edge abuts against the stoppers 208 that prevent an excess loading motion of the medium. When this state is detected by a detection member not shown, the drive rollers 101 are moved from the loading position to the retracted position, getting out of contact with the recording medium B, as shown in FIG. 14 and FIG. 20. At this time because the drive rollers 101 are rotated in the loading direction as they move to the retracted position, the recording medium B is not displaced by the drive rollers 101 moving toward the retracted position. When the drive rollers 101 reach the retracted position, the recording medium B is left to fall onto and be supported on the support surface 301a of the tray 301, against which the tray retainer member 304 is held. Further, when a detection member not shown detects when the loading of the recording medium B is finished, the outer circumferential edge of the completely loaded recording medium B on the carriage chassis 200 side overlaps the curved geometry side of the pickup 203 and turntable 201 mounted on the carriage chassis 200 in the standby state.

In this state, the pickup 203 as described earlier is located at a position near the turntable 201 where it is not in contract with the recording medium B and the turntable 201 is also not in contact with the recording medium B. So, the recording medium B loaded into the tray 301 does not hit them.

Then, the slide member 6 (slide member 5) is driven to lower the movable chassis 400. When the pins 400c are situated at the second lowest step of the inclined slot 6c, the wedge members 410 are pivoted counterclockwise to disengage the projections 301f of the tray 301 from the cam surfaces 410d, 410e.

From this state, the slide member 6 (slide member 5) is further driven to lower the movable chassis 400. When the pins 400c are positioned at the lowest step of the inclined slot 6c, the movable chassis 400 is situated at the height position shown in FIG. 16 and stopped. Now, a series of steps of accommodation operation is complete.

By repeating the above steps successively, the trays 301 of the accommodation unit 300 can store up to six recording mediums B.

The operation of unloading the recording medium B supported on the tray 301 from the insertion opening 11 can be performed by reversing the procedure of loading the recording medium B described above, except that the drive rollers 101 need to be rotated in the unloading direction. Thus, the explanation about the unloading operation is omitted here.

Next, the procedure for playing back the recording medium B supported on the second lowest tray 301 will be described by referring to FIGS. 16 through 24.

When the playback device receives a command from a control means not shown for playing back the recording medium B supported on the second lowest tray 301, the movable chassis 400 in the state before the accommodation unit 300 shown in FIG. 16 accommodates the recording medium B is driven to position the wedge members 410 and carriage chassis 200 at a height corresponding to the second lowest tray 301.

That is, the slide member 6 (slide member 5) is driven to raise the movable chassis 400 in order to position the pins 400c at the second lowest step of the inclined slot 6c. The movable chassis 400 is positioned at a height shown in FIG. 17 so that the recording medium B supported on the second lowest tray 301 can be played back or recorded.

Then, to secure a space between the trays 301 for the carriage chassis 200 to enter, the wedge members 410 are pivoted clockwise. The cam surface 410d of the wedge members 410 engages the projections 301f of the third lowest tray and pushes them up to move up four trays, third lowest to sixth lowest tray. At the same time, the projections 301f of the second lowest tray 301 ride over the cam surface 410e into the slot 410c. The projections 301f of the lowest tray 301 engages the cam surface 410e.

When the wedge members 410 are further pivoted clockwise, the four trays, third lowest to sixth lowest, are moved higher than shown in FIG. 17. At the same time, the projections 301f of the second lowest tray 301 are lifted by the cam surface 410f. The projections 301f of the lowest tray 301 are pressed down by the cam surface 410e and stay as they are. Hence, around the second lowest tray 301 a space is formed into which the carriage chassis 200 can enter. This space is wider than the space formed when loading or unloading the recording medium B. The second lowest tray 301 has its projections 301f fitted deep into the slot 410c and held by the wedge members 410.

Then, as shown in FIG. 24, as the movable pin 3 (shown in FIG. 2) is driven along the arc slot 402 (shown in FIG. 7) by a drive mechanism not shown, the carriage chassis 200 that was resting at the standby position pivots about the support shaft 401 through a predetermined distance to a playback position in the space. Here, because the carriage chassis 200 enters into the space, with its clamper 202 and turntable 201 in a declamped state, i.e., in a separated state, the space is so set to secure a sufficient height (shown in FIG. 21).

When the carriage chassis 200 reaches the playback position in the space, the clamper 202 lowers in response to the motion of the carriage chassis 200 to clamp the recording medium B. Simultaneously with this operation, the wedge members 410 are slightly pivoted counterclockwise to lower the second lowest tray 301. As a result, the recording medium B that was supported on the second lowest tray 301 is now supported on the turntable 201, somewhat separating the tray 301 and the recording medium B. This operation and the lowering motion of the clamper 202 are performed almost simultaneously to clamp the recording medium B (shown in FIG. 2).

Figure 21:
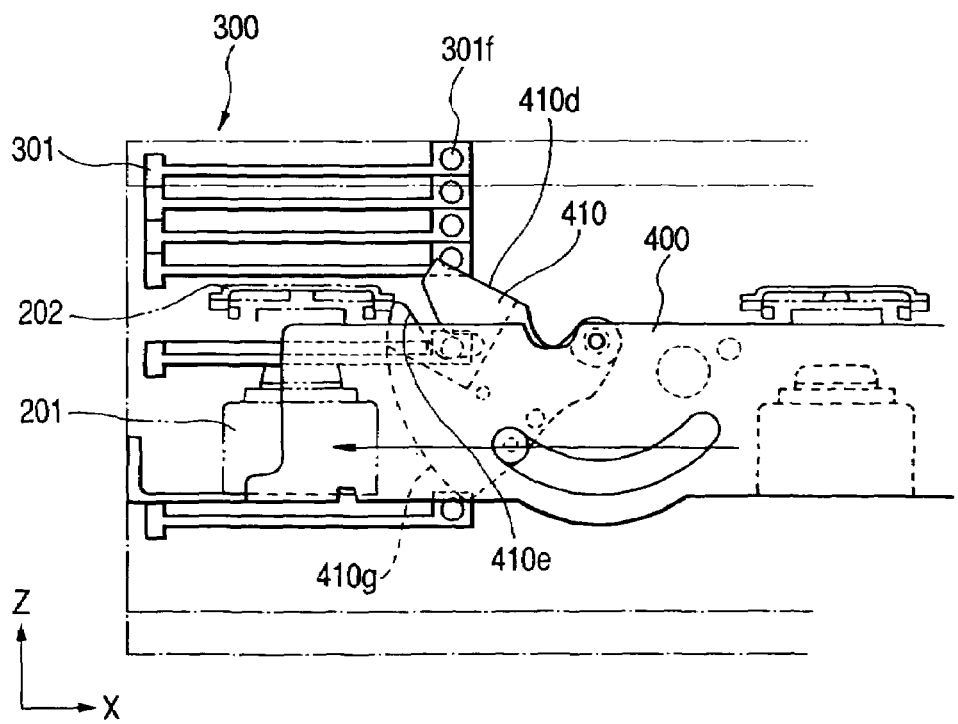
FIG. 21 is an explanatory diagram of the recording medium playback device.
Figure 22:
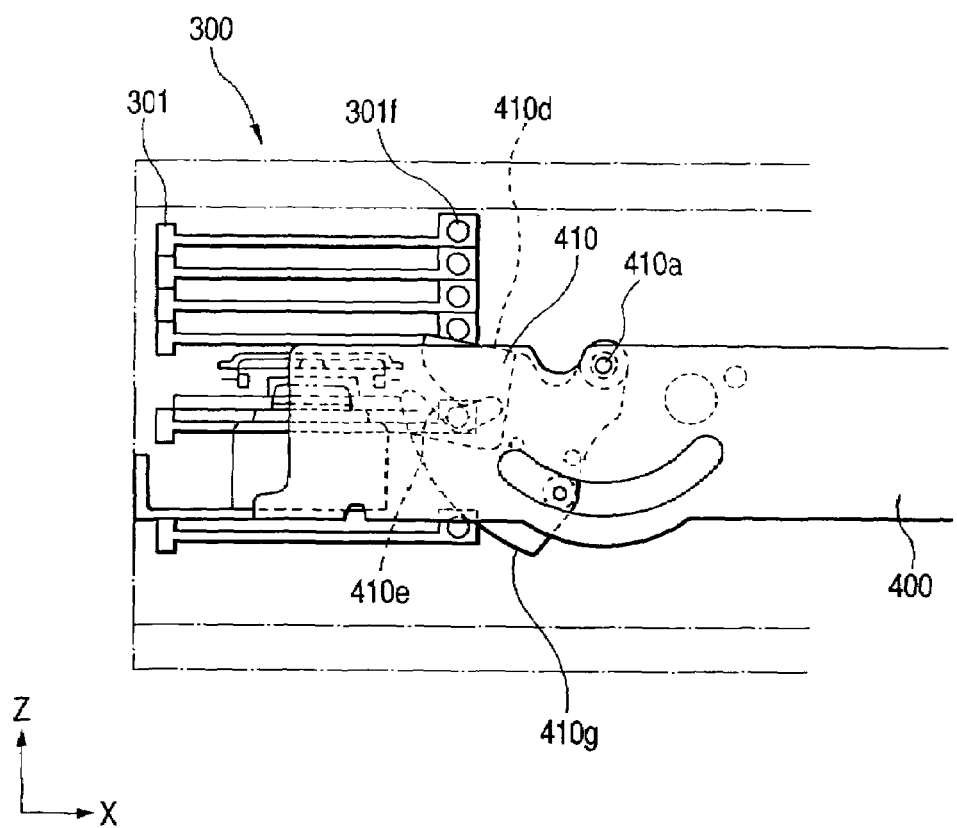
FIG. 22 is an explanatory diagram of the recording medium playback device.

With the counterclockwise pivoting motion of the wedge members 410, the four trays, third lowest to sixth lowest, are moved down from the state of FIG. 21. Thus, the space occupied by the six trays 301 in the Z direction is made smaller than that shown in FIG. 21 into which the carriage chassis 200 enters. With this operation it is possible to secure a space required for the floating support during the playback of the recording medium. The device can therefore be reduced in thickness by this height reduction.

Then, in this condition the pickup 203 is moved by the pickup moving mechanism 204 from the inner circumferential side of the recording medium B toward the outer circumferential side to play back the information recorded surface of the recording medium B.

When, after the playback of the recording medium B is completed, the carriage chassis 200 is to be returned to the standby position, the pickup moving mechanism 204 is set in advance to move the pickup 203 toward right in the figure.

Then, when the pickup 203 contacts the detecting member 12, it is decided that the pickup 203 is moving further inside from the innermost circumferential side of the recording medium B with respect to the turntable 201, immediately stopping the pickup moving mechanism 204 to prevent the pickup 203 from abutting against the turntable 201. Then, the pickup 203 is slid a predetermined distance in the opposite direction until the detecting member 12 no longer detects the pickup 203, thus protecting the pickup 203 and the pickup moving mechanism 204 against being applied with unnecessary loads.

In this way, the clamping operation on the recording medium B by the carriage chassis 200 is performed as the carriage chassis 200 moves from the retracted position to the playback position. At the same time that the carriage chassis 200 is located at the playback position, the clamp operation is performed. Then, when the playback of the recording medium B is finished, the carriage chassis 200 is moved from the playback position to the retracted position and at the same time the recording medium B is declamped.

The operation of selecting the recording medium B installed in the accommodation unit 300 and playing it back has been described. Because the recording medium B placed in the tray 301 can be put closer to the carriage chassis 200 side, the clearance between the recording medium B on the tray 301 and the carriage chassis 200 can be further reduced, leading to a reduction in the longitudinal depth of the playback device A.

As described above, the recording medium playback device of this invention is constructed such that, when the carriage chassis is in the standby position, the pickup is situated on a vertical tangential plane which is tangent to the outer circumferential edge of the recording medium on the carriage chassis side at a point where the outer circumferential edge is intersected by the loading center line of the recording medium when the recording medium is completely loaded in the recording medium accommodation unit by the recording medium loading means. In this construction, the outer circumferential edge on the carriage chassis side of the recording medium loaded into the accommodation unit overlaps the pickup over a predetermined distance. This allows the recording medium placed in the accommodation unit to be set closer to the carriage chassis side and also the turntable to be situated on the vertical tangential plane. Thus, the clearance between the recording medium put in the accommodation unit and the carriage chassis can be minimized, reducing the longitudinal depth of the recording medium playback device. The playback device therefore can be installed in the accommodation space in an instrument panel whose dimensions are compatible with a predetermined standard. This in turn enhances the ease with which the user can handle the playback device and also prevents an ingress of dust or dirt into the recording medium playback device.

What is claimed is:

1. A recording medium playback device comprising:
   a recording medium accommodation unit for accommodating a plurality of recording mediums in a stacked array;
   a carriage chassis having at least a pickup, a turntable and a pickup moving means, said pickup moving means being adapted to move said pickup in the direction of playing back the recording medium;
   a moving means for moving said carriage chassis from a standby position to a position between the recording mediums accommodated in said recording medium accommodation unit to play back the recording medium; and
   a recording medium loading means for loading the recording medium inserted from outside into said recording medium accommodation unit;
   wherein when said carriage chassis is in the standby position, said pickup is situated on a vertical tangential plane which is tangent to an outer circumferential edge of the recording medium on said carriage chassis side at a point where the outer circumferential edge is intersected by a loading center line of the recording medium when the recording medium is completely loaded in said recording medium accommodation unit by said recording medium loading means, and
   wherein an outer circumferential edge on said carriage chassis side of said completely loaded recording medium overlaps an arc-shaped side of said pickup when said pickup is in a standby position.

2. The recording medium playback device according to claim 1, wherein
   said pickup moving means has a feed screw mechanism to move said pickup in a recording medium playback direction, and
   said feed screw mechanism is provided on the underside of said pickup.

3. The recording medium playback device according to any one of claims 1 and 2, wherein
   said pickup moving means has a guide means to guide said pickup in the recording medium playback direction, and
   said guide means is provided on the underside of said pickup.

4. The recording medium playback device according to claim 1, wherein
   when said carriage chassis is in the standby position, said pickup on said carriage chassis is at a position not on the loading center of the recording medium accommodated in said recording medium accommodation unit.

5. A recording medium playback device comprising:
   a recording medium accommodation unit for accommodating a plurality of recording mediums in a stacked array;
   a carriage chassis having at least a pickup, a turntable and a pickup moving means, said pickup moving means being adapted to move said pickup in the direction of playing back the recording medium;
   a moving means for moving said carriage chassis from a standby position to a position between the recording mediums accommodated in said recording medium accommodation unit to play back the recording medium; and a recording medium loading means for loading the recording medium inserted from outside into said recording medium accommodation unit;

wherein when said carriage chassis is in the standby position, said turntable is situated on a vertical tangential plane which is tangent to an outer circumferential edge of the recording medium on said carriage chassis side at a point where the outer circumferential edge is intersected by a loading center line of the recording medium where the recording medium is completely loaded in said recording medium accommodation unit by said recording medium loading means, and wherein an outer circumferential edge on said carriage chassis side of said completely loaded recording medium overlaps an arc-shaped side of said pickup when said pickup is in a standby position.

6. The recording medium playback device according to claim 2, wherein a width of a part of said carriage chassis in the recording medium loading direction is smaller than a width of said pickup in the recording medium loading direction, and a part of the recording medium accommodated in said recording medium accommodation unit is situated in an area formed by setting the width of a part of said carriage chassis smaller than the width of said pickup.

7. The recording medium playback device according to claim 3, wherein a width of a part of said carriage chassis in the recording medium loading direction is smaller than a width of said pickup in the recording medium loading direction, and a part of the recording medium accommodated in said recording medium accommodation unit is situated in an area formed by setting the width of a part of said carriage chassis smaller than the width of said pickup.

8. The recording medium playback device according to claim 4, wherein a width of a part of said carriage chassis in the recording medium loading direction is smaller than a width of said pickup in the recording medium loading direction, and a part of the recording medium accommodated in said recording medium accommodation unit is situated in an area formed by setting the width of a part of said carriage chassis smaller than the width of said pickup.

9. A recording medium playback device, comprising:

a recording media holder that holds a plurality of recording media; and a carriage chassis having a moveable pickup, wherein the carriage chassis moves between a standby position and a position between the plurality of recording media in the recording media holder to play back a selected recording medium of the plurality of recording media, wherein, when the carriage chassis is in the standby position, the pickup is situated on a vertical tangential plane which is tangent to an outer circumferential edge of the selected recording medium, wherein the outer circumferential edge is disposed on a carriage chassis side of the selected recording medium, wherein the vertical tangential plane is tangent to the outer circumferential edge at a point where the outer circumferential edge is intersected by a loading center line of the selected recording medium when the selected recording medium is completely loaded in the recording media holder, and wherein an outer circumferential edge on said carriage chassis side of said completely loaded recording medium overlaps an arc-shaped side of said pickup when said pickup is in a standby position.

10. The recording medium playback device according to claim 9, wherein the carriage chassis comprises a feed screw mechanism that moves the pickup in a recording medium playback direction, and wherein the feed screw mechanism is provided on an underside of the pickup.

11. The recording medium playback device according to claim 9, further comprising a guide that guides the pickup in the recording medium playback direction, wherein the guide is provided on the underside of the pickup.

12. The recording medium playback device according to claim 10, further comprising a guide that guides the pickup in the recording medium playback direction, wherein the guide is provided on the underside of the pickup.

13. The recording medium playback device according to claim 9, wherein, when the carriage chassis is in the standby position, the pickup is not located on the loading center of the selected recording medium accommodated in the recording media holder.

* * * * *